United States Patent
Vig et al.

(10) Patent No.: US 11,042,503 B1
(45) Date of Patent: Jun. 22, 2021

(54) CONTINUOUS DATA PROTECTION AND RESTORATION

(71) Applicant: Amazon Technologies, Inc., Seattle, WA (US)

(72) Inventors: Akshat Vig, Seattle, WA (US); Go Hori, Seattle, WA (US); Tate Andrew Certain, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 402 days.

(21) Appl. No.: 15/920,193

(22) Filed: Mar. 13, 2018

Related U.S. Application Data

(60) Provisional application No. 62/590,227, filed on Nov. 22, 2017.

(51) Int. Cl.
*G06F 16/11* (2019.01)
*G06F 11/14* (2006.01)

(52) U.S. Cl.
CPC ........ *G06F 16/113* (2019.01); *G06F 11/1451* (2013.01); *G06F 11/1469* (2013.01)

(58) Field of Classification Search
CPC . G06F 16/278; G06F 16/2358; G06F 11/1451
See application file for complete search history.

(56) References Cited

U.S. PATENT DOCUMENTS

| | | | |
|---|---|---|---|
| 5,586,264 A | 12/1996 | Belknap et al. | |
| 5,615,364 A | 3/1997 | Marks | |
| 5,692,177 A | 11/1997 | Miller | |

(Continued)

FOREIGN PATENT DOCUMENTS

| | | |
|---|---|---|
| CN | 104750773 | 7/2015 |
| JP | 2014141343 | 8/2014 |
| WO | 2012168365 | 12/2012 |

OTHER PUBLICATIONS

"Cloud Spanner: TrueTime and External Consistency", Retrieved from URL: https://cloud.google.com/spanner/docs/true-time-external-consistency on Feb. 28, 2018, pp. 1-6.

(Continued)

*Primary Examiner* — Loc Tran

(74) *Attorney, Agent, or Firm* — Robert C. Kowert; Kowert, Hood, Munyon, Rankin & Goetzel, P.C.

(57) ABSTRACT

Changes made to a database table are accumulated, in durable storage, and snapshots of partitions of the table are obtained. For successive snapshots of a partition, the system accesses a previous snapshot, applies changes from the accumulated changes, and stores the updated snapshot to a durable data store. The accumulated changes and the successive partition snapshots are made available to restore the database to any point in time across a continuum between successive snapshots. Although each partition of the table may have a backup snapshot that was generated at a time different from when other partition snapshots were generated, changes from respective change logs may be selectively log-applied to distinct partitions of a table to generate an on-demand backup of the entire table at common point-in-time across partitions. Point-in-time restores of a table may rely upon a similar process to coalesce partition snapshots that are not aligned in time.

17 Claims, 12 Drawing Sheets

(56) References Cited

U.S. PATENT DOCUMENTS

| | | | |
|---|---|---|---|
| 5,768,527 A | 6/1998 | Zhu et al. |
| 5,813,009 A | 9/1998 | Johnson et al. |
| 5,842,222 A | 11/1998 | Nishimura et al. |
| 5,991,772 A | 11/1999 | Doherty et al. |
| 6,085,200 A | 7/2000 | Hill et al. |
| 6,161,109 A | 12/2000 | Matamoros et al. |
| 6,199,074 B1 | 3/2001 | Kern et al. |
| 6,272,598 B1 | 8/2001 | Arlitt et al. |
| 6,374,266 B1 | 4/2002 | Shnelvar |
| 6,374,267 B1 | 4/2002 | Tam |
| 6,397,351 B1 | 5/2002 | Miller et al. |
| 6,505,216 B1 | 1/2003 | Schutzman et al. |
| 6,651,077 B1 | 11/2003 | East et al. |
| 6,728,879 B1 | 4/2004 | Atkinson |
| 7,096,392 B2 | 8/2006 | Sim-Tang |
| 7,328,226 B1 | 2/2008 | Karr et al. |
| 7,330,859 B2 | 2/2008 | Gupta et al. |
| 7,343,356 B2 | 3/2008 | Prahlad et al. |
| 7,353,241 B2 | 4/2008 | Erlingsson |
| 7,373,364 B1 | 5/2008 | Chapman |
| 7,386,586 B1 | 6/2008 | Headley et al. |
| 7,509,358 B1 | 3/2009 | Bingham et al. |
| 7,546,428 B1 | 6/2009 | McAndrews et al. |
| 7,565,661 B2 | 7/2009 | Sim-Tang |
| 7,606,481 B2 | 10/2009 | Kuruma |
| 7,606,841 B1 | 10/2009 | Ranade |
| 7,606,844 B2 | 10/2009 | Kottomtharayil |
| 7,653,668 B1 | 1/2010 | Shelat et al. |
| 7,657,781 B1 | 2/2010 | Dixon et al. |
| 7,668,876 B1 | 2/2010 | Kulkarni |
| 7,680,843 B1 | 3/2010 | Panchbudhe et al. |
| 7,689,597 B1 | 3/2010 | Bingham et al. |
| 7,716,186 B2 | 5/2010 | Cannon et al. |
| 7,730,034 B1 | 6/2010 | Deflaux et al. |
| 7,792,802 B1 | 9/2010 | Rao |
| 7,802,001 B1 | 9/2010 | Petry et al. |
| 7,921,077 B2 | 4/2011 | Ting et al. |
| 7,949,662 B2 | 5/2011 | Farber et al. |
| 8,041,679 B1 | 10/2011 | Narayanan |
| 8,065,278 B2 | 11/2011 | Beatty et al. |
| 8,078,582 B2 | 12/2011 | Wang et al. |
| 3,095,745 A1 | 1/2012 | Schmidt et al. |
| 8,108,343 B2 | 1/2012 | Wang et al. |
| 8,117,164 B2 | 2/2012 | Spektor et al. |
| 8,161,255 B2 | 4/2012 | Anglin et al. |
| 8,166,263 B2 | 4/2012 | Prahlad et al. |
| 8,190,960 B1 | 5/2012 | Bahadur et al. |
| 8,200,615 B2 | 6/2012 | Halliday |
| 8,244,679 B1 | 8/2012 | Bilsborough |
| 8,255,739 B1 | 8/2012 | Chatterjee et al. |
| 8,332,842 B2 | 12/2012 | Bauer et al. |
| 8,359,596 B2 | 1/2013 | Kobayashi et al. |
| 8,364,648 B1 * | 1/2013 | Sim-Tang ............ G06F 16/2358 |
| | | 707/674 |
| 8,386,631 B2 | 2/2013 | Nilsson et al. |
| 8,386,771 B2 | 2/2013 | Baker et al. |
| 8,463,633 B2 | 6/2013 | Jung et al. |
| 8,478,726 B2 | 7/2013 | Habermann et al. |
| 8,488,661 B2 | 7/2013 | Menon et al. |
| 8,510,270 B2 | 8/2013 | Pareek et al. |
| 8,521,695 B2 | 8/2013 | Zwilling et al. |
| 8,533,478 B2 | 9/2013 | Aguilera et al. |
| 8,543,746 B2 | 9/2013 | Roever |
| 8,548,945 B2 | 10/2013 | Dwyer et al. |
| 8,566,286 B1 | 10/2013 | Hawton et al. |
| 8,572,091 B1 * | 10/2013 | Sivasubramanian ........................ |
| | | G06F 16/2255 |
| | | 707/747 |
| 8,612,700 B1 | 12/2013 | Armstrong et al. |
| 8,626,709 B2 | 1/2014 | Isaacson et al. |
| 8,635,187 B2 | 1/2014 | Beatty et al. |
| 8,650,155 B2 | 2/2014 | Corbin et al. |
| 8,676,752 B2 | 3/2014 | Kundu et al. |
| 8,712,970 B1 | 4/2014 | Sim-Tang |
| 8,719,362 B2 | 5/2014 | Wu et al. |
| 8,725,934 B2 | 5/2014 | Batwara et al. |
| 8,805,810 B2 | 8/2014 | Lucas |
| 8,818,954 B1 | 8/2014 | Bergant et al. |
| 8,825,938 B1 | 9/2014 | Ellard et al. |
| 8,892,938 B1 | 11/2014 | Sundaram et al. |
| 9,183,200 B1 | 11/2015 | Liu et al. |
| 9,235,606 B1 | 1/2016 | Mooney et al. |
| 9,552,382 B2 | 1/2017 | Barrus |
| 9,558,078 B2 | 1/2017 | Farlee et al. |
| 9,703,640 B2 | 7/2017 | Beatty et al. |
| 9,720,620 B1 | 8/2017 | Wei et al. |
| 9,720,991 B2 | 8/2017 | Kritchko et al. |
| 9,785,510 B1 | 10/2017 | Madhavarapu et al. |
| 10,162,715 B1 | 12/2018 | MacDonald McAlister et al. |
| 2002/0114341 A1 | 8/2002 | Sutherland et al. |
| 2002/0152299 A1 | 10/2002 | Traversat et al. |
| 2003/0220935 A1 | 11/2003 | Vivian et al. |
| 2004/0215803 A1 | 10/2004 | Traversat et al. |
| 2005/0022213 A1 | 1/2005 | Yamagami |
| 2005/0188256 A1 | 8/2005 | Stager et al. |
| 2005/0251540 A1 | 11/2005 | Sim-Tang |
| 2006/0020634 A1 | 1/2006 | Huras et al. |
| 2006/0053262 A1 | 3/2006 | Prahlad et al. |
| 2006/0100972 A1 | 5/2006 | Chianese et al. |
| 2006/0253600 A1 | 11/2006 | Hannuksela |
| 2007/0027937 A1 | 2/2007 | McGrattan et al. |
| 2007/0162516 A1 | 7/2007 | Thiel et al. |
| 2007/0250835 A1 | 10/2007 | Kobayashi et al. |
| 2007/0276884 A1 | 11/2007 | Hara et al. |
| 2007/0028853 A1 | 12/2007 | Romem et al. |
| 2007/0288530 A1 | 12/2007 | Romem et al. |
| 2008/0294696 A1 | 11/2008 | Frandzel |
| 2008/0295111 A1 * | 11/2008 | Craft .................. G06F 11/1438 |
| | | 719/313 |
| 2009/0125362 A1 | 5/2009 | Reid et al. |
| 2009/0238262 A1 | 9/2009 | Miceli |
| 2009/0271605 A1 | 10/2009 | Park et al. |
| 2010/0005259 A1 | 1/2010 | Prahlad et al. |
| 2010/0257138 A1 | 10/2010 | Wang et al. |
| 2010/0257140 A1 | 10/2010 | Davis et al. |
| 2010/0262717 A1 | 10/2010 | Critchley et al. |
| 2010/0274762 A1 | 10/2010 | Murphy et al. |
| 2011/0055624 A1 * | 3/2011 | Jess .................... G06F 11/1448 |
| | | 714/100 |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2012/0166401 A1 | 6/2012 | Li et al. |
| 2012/0209817 A1 | 8/2012 | Golab et al. |
| 2012/0221715 A1 | 8/2012 | Hamada |
| 2012/0250682 A1 | 10/2012 | Vincent et al. |
| 2012/0265890 A1 | 10/2012 | Carlson et al. |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262388 A1 | 10/2013 | Sorenson et al. |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0046906 A1 | 2/2014 | Patiejunas et al. |
| 2014/0047263 A1 | 2/2014 | Coatney et al. |
| 2014/0279905 A1 | 9/2014 | Muniswamy-Reddy et al. |
| 2014/0324785 A1 * | 10/2014 | Gupta ................. G06F 16/2365 |
| | | 707/689 |
| 2014/0358844 A1 | 12/2014 | Mundlapudi et al. |
| 2015/0172412 A1 | 6/2015 | Escriva et al. |

(56) References Cited

U.S. PATENT DOCUMENTS

2016/0077744 A1   3/2016 Pundir et al.
2016/0077923 A1   3/2016 Zhang et al.

OTHER PUBLICATIONS

Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", In the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
"Capturing Table Activity with DynamoDB Streams", dated Oct. 19, 2018, pp. 1-8.
Randall Hunt "New-Amazon DynamoDB Continuous Backups and Points-In-Time Recpvery", Mar. 26, 2018, pp. 1-9.
"Appendix E. Realese Notes", (PostgreSQL: Documentation: 10: E.144. Release 9.0.7), Oct. 19, 2018, pp. 1-4.
"PostgreSQL: THe World's Most Advanced Open Source Relational Database", (https://www.postgresql.org), dated Oct. 19, 2018, pp. 1-10.
U.S. Appl. No. 14/977,472, filed Dec. 21, 2015, Akshat Vig.
U.S. Appl. No. 15/676,933, filed Aug. 14, 2017, Elizabeth Sanocki.
U.S. Appl. No. 15/728,271, filed Oct. 9, 2017, Pradeep Jnana Madhavarapu.
U.S. Appl. No. 14/977,453, filed Dec. 21, 2015, Yan Valerie Leshinsky.
U.S. Appl. No. 15/807,367, filed Nov. 8, 2017, Vaibhav Jain.
U.S. Appl. No. 15/920,207, filed Mar. 13, 2018, Akshat Vig.
U.S. Appl. No. 16/101,153, filed Aug. 10, 2018, Akshat Vig.
U.S. Appl. No. 15/920,193, filed Mar. 13, 2018, Akshat Vig.
U.S. Appl. No. 16/197,033, filed Nov. 20, 2018, Rachit Jain.
U.S. Appl. No. 16/231,109, filed Dec. 21, 2018, Grant Alexander MacDonald McAlister.
Amazon Web Services, "Amazon DynamoDB Developer Guide", API Version, Aug. 10, 2012, pp. 1-793.
Amazon Web Services, "Amazon DynamoDB Streams API Reference", API Version, Aug. 10, 2012, pp. 1-29.
U.S. Appl. No. 14/077,173, filed Nov. 11, 2013, Marvin Michael Theimer et al.
U.S. Appl. No. 14/077,171, filed Nov. 11, 2013, Marvin Michael Theimer et al.
U.S. Appl. No. 14/136,624, filed Dec. 20, 2013, Marvin Michael Theimer et al.
U.S. Appl. No. 14/136,645, filed Dec. 20, 2013, Marvin Michael Theimer et al.
U.S. Appl. No. 14/077,167, filed Nov. 11, 2013, Marvin Michael Theimer et al.
U.S. Appl. No. 14/077,162, filed Nov. 11, 2013, Marvin Michael Theimer et al.
U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie-Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
SIGMOD Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2011.
GitHub, "Tutorial", pp. 1-8, Oct. 8, 2013.
U.S. Appl. No. 13/764,716, filed Feb. 11 ,2013, Kathryn Marie Shin et al.
U.S. Appl. No. 13/764,711, filed Feb. 11, 2013, Kathryn Marie Shin et al.
U.S. Appl. No. 61/738,967, filed Dec. 18, 2012, Kathryn Marie Shin et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.

(56) References Cited

OTHER PUBLICATIONS

U.S. Appl. No. 15,717,606, filed Sep. 27, 2017, Vaibhav Jain.

* cited by examiner

_US 11,042,503 B1_

CONTINUOUS DATA PROTECTION AND RESTORATION

This application claims benefit of priority to U.S. Provisional Application Ser. No. 62/590,227, entitled "Restore and Point-in-time Restore," filed Nov. 22, 2017, and which is incorporated herein by reference in its entirety.

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in a number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

Clients with large-scale databases may create proprietary backup solutions that scan data from a database into scalable, durable storage, but these solutions suffer from a number of problems such as taking too much time to perform the backup, interrupting a customer's regular workflow, tying up resources (e.g., scan-based solutions can compete with production workloads for read throughput), and providing only limited options for restoring from static backups (e.g., periods of time between backups may be too long). Additionally, getting a consistent backup across a large number of storage nodes can be hard to do without the customer stopping all writes. Scan-based solutions can be expensive (e.g., a scan backup of a 100 TB table, etc.) both in compute costs and storage costs and may not provide a managed experience (e.g., a managed experience where customers can view characteristics of the backups, manage the backups, etc.).

Some systems perform timed, periodic backups by scanning the data store to create a copy of the data store. But, the period of time in-between backups of a periodic system may be of a length that prohibits restoring the data store to a particular point-in-time of interest (e.g., if the point-in-time of interest falls in-between to backups).

Some database systems require backup of the entire table (e.g., all partitions are backed-up at once, as a coherent whole). Generally, database systems require obtaining a copy of the entire authoritative database in order to generate the next full backup snapshot.

Figure 1:
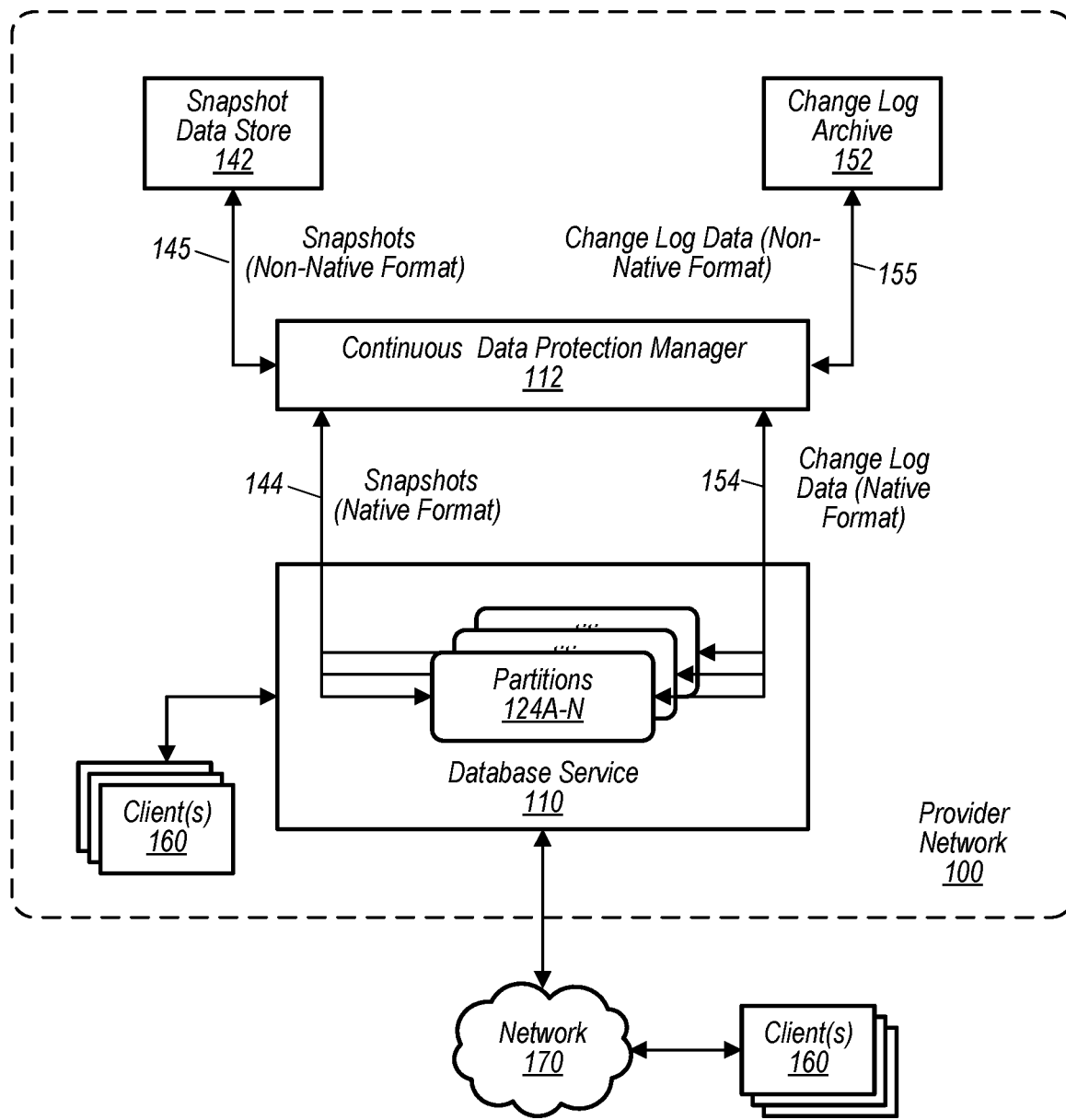
FIG. 1 is a block diagram illustrating logical relationships between components of a system for continuous data protection, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed is a continuous data protection system that captures all of the changes happening on the data store (e.g., a database) and periodically builds system snapshots (sometimes referred to as copies, herein) by applying logs on the closest system snapshot, in embodiments. The system may be able to apply transaction logs to a previous logical backup to create a new point-in-time logical backup, without losing any customer data, in some instances. For example, system snapshots may be built at a partition level (e.g., for systems that partition data) by applying the change logs to prior snapshots. In some such embodiments, the continuous data protection system generates backups without any additional queries or scanning of the client's production data source by relying on prior snapshots and change log data to create new snapshots, instead. Accumulation of change log data for a table, as well as generation of updates to snapshots for the table may be performed independently for each partition (e.g., at a different time) of a same table, based on characteristics particular to each partition for example, in some embodiments.

In embodiments, a log apply service of the continuous data protection system is responsible for at least two core functionalities to support backup and restore. During a conversion process, the log apply service may convert partition snapshots (sometimes referred to as backups) from a physical format (e.g., mysql) to a logical format snapshot. The log apply service may also create subsequent point-in-time logical partition snapshots by applying transaction logs to a previous logical partition snapshot, and create a complete user backup, for example.

In some embodiments, continuous capture of individual changes to a table provide for a more fine-grained availability of those individual changes at a later time. For example, the accumulation of individual changes to the data-data that constitutes a state of the database table at a time, in embodiments, may be used to more accurately take the table—or partition—back to a particular state at any point-in-time along a continuum. Such features contrast with prior systems that could only take the system back to a select few points-in-time when snapshots of the system were taken. In some such prior systems, the snapshots added additional burden to the client's production system because the snapshots were created from scans of the production database, interrupting or delaying production services. Additionally, scan-based snapshots take relatively more time to create, and fail to provide as accurate a view of the database as the techniques disclosed herein, at least because, by the time the scan completes (at least for large data sets), data that has already been scanned may have been changed.

Additionally, in at least some embodiments, the techniques described herein are applied on a partition-by-partition basis. For example, snapshots and change log data for a particular partition may be kept in an uncoordinated manner, with respect to the other partitions of the table (e.g., according to different schedules). A relatively inactive partition of a table may have a snapshot generated based on a maximum duration of time threshold, while another relatively active partition of that same table may have snapshots generated more often, based on an amount of accumulated changes, as just one example of many. The times at which the snapshots are created for either partition may not have any relationship, and may be based upon the particular characteristics of that partition, in embodiments.

The above-noted process may be triggered when a customer enables backups for a given table. In embodiments, the continuous data protection manager 112 may initiate the first complete backup of the table, during the initial backup process. For example, for all partitions of the table, the continuous data protection manager or service may store the snapshots by exporting data from storage nodes to storage-level physical format into a durable storage.

In embodiments, a log apply process is used whenever the continuous data protection manager or service decides a new logical partition snapshot is required to bound the time taken for creating point-in-time backups. Log apply may also be used during restore to apply logs to a backup.

In some systems, log applying backups is an expensive operation (e.g., when there is a relatively greater amount of time and greater number of changes between backups). By relying on pre-existing incremental partition images to define a backup, the system may significantly reduce the load on the log apply service, saving compute costs. Additionally, by relying upon incremental partition images to define a backup, the system may allow users to create many backups partially sharing the same set of logs and base partition images, which may translate into storage costs savings.

In some embodiments, a periodicity at which system snapshots of the partitions are built is decided based on an amount of logs accumulated. For example, the periodicity may be based on a threshold amount of logs accumulated. In another example, the periodicity may be based upon a rate of change of the logs accumulated. For instance, if the system is becoming more active more changes are being generated . . . the increase in the rate of change of the number of logs may be used as a trigger to increase the periodicity. In some embodiments, the log apply service applies logs for a single partition on a single host. In some circumstances (e.g., large tables) each partition may be log applied in parallel to reduce the time to apply the logs for the table, e.g., by respective parallel processes.

In embodiments, both the newly-created snapshots as well as the change logs are stored to durable storage. In some such embodiments, the snapshots and the durably-stored change logs may be used to restore the partition. In some embodiments, the continuous data protection backup service provides an interface and functionality supporting unified management of the data, while optimizing customer costs and restore times via periodic log application and trimming.

Another benefit of some embodiments is a predictable time to recovery, by accurately identifying continuous backups, which, if restored, would cause the system to break SLAs and take appropriate action to bring the system back into compliance.

The systems and methods described herein may be employed in various combinations and in various embodiments to implement a network-based service that provides data storage services to storage service clients (e.g., user, subscribers, or client applications that access the data storage service on behalf of users or subscribers). The service may, in some embodiments, support the continuous data protection of tables that are maintained on behalf of clients in a data store, e.g., a non-relational database or other type of database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table as a synchronous operation while the database continues to receive, accept, and service read and/or write operations that are directed to the table. In some embodiments, in response to a request to back up a table, the system may create a backup of each individual partition independently and (in some cases) in parallel (i.e., substantially concurrently). In embodiments, when a request to back up a table is received, the system may guarantee that all write operations that were directed to the table up to that point are included in the backup. In some embodiments, such a guarantee may not be made.

In some embodiments, backup operations may be initiated by data storage service users (e.g., customers, service subscriber, and/or client applications) using a "CreateBackup" application programming interface (API). In some embodiments, the systems described herein may support the scheduling of backups (e.g., every day at a particular time, or according to a published, but not necessarily periodic, schedule). In response to receiving a request to back up a table, these systems may back up each partition of the table as an individual item in a remote storage system (e.g., a key-value durable storage system), and may store metadata about the backup that is subsequently usable when restoring the backup to a new database (e.g., a new database table). In some embodiments, the system may be configured to initiate separate backup operations for each of the partitions of a table automatically (e.g., programmatically and without user intervention) in response to a request to back up the table, and to manage those backup operations on a per-partition basis (again, without user involvement).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In embodiments, the system disclosed herein may implement an application program interface (API) that provides access to configuration setting associated with the partition, the configuration settings including, but not limited to: a maximum backup time that indicates a maximum period of time between snapshots of the partition; a minimum backup time that indicates a minimum period of time between snapshots of the partition; and a duration of time to retain snapshots of the partition.

Another API may allow consumers to update the current settings for a table within the database service, for example, to enable or disable the continuous backups and modify the duration of time to retain backups.

Yet another API may provide the option to enable continuous backups for a table. The triggered action may initiate the creation of a continuous backup through the workflow described herein, such as by initiation of the archival copy of logs for a table and creation of an initial backup of a table in a logical format.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created or restored from backup, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments of the distributed database systems described herein, each storage node may include multiple storage devices or logical volumes, each of which stores various partition replicas. For example, in one embodiment, each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partitions, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

As noted above, from a user's perspective, a backup operation generally operates to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). In some embodiments, this metadata may be stored in the data storage system itself, and a copy of the metadata may also be stored in the remote storage system into which tables are backed up.

FIG. 1 is a block diagram illustrating a system for continuous data protection, according to some embodiments. Provider network 100 may be a private or closed system, in one embodiment, or may be set up by an entity such as a company or a public-sector organization to provide one or more services (such as various types of cloud-based storage) accessible via the Internet and/or other networks to clients 160, in another embodiment. In one embodiment, provider network 100 may be implemented in a single location or may include numerous data centers hosting various resource pools, such as collections of physical and/or virtualized computer servers, storage devices, networking equipment and the like (e.g., computing system 1200 described below with regard to FIG. 12), needed to implement and distribute the infrastructure and storage services offered by the provider network 100. In one embodiment, provider network 100 may implement various computing resources or services, such as a database service 110 or other data processing (e.g., relational or non-relational (NoSQL) database query engines, data warehouse, data flow processing, and/or other large scale data processing techniques), data storage services (e.g., an object storage service, block-based storage service, or data storage service that may store different types of data for centralized access), virtual compute services, and/or any other type of network based services (which may include various other types of storage, processing, analysis, communication, event handling, visualization, and security services not illustrated).

In some embodiments, the provider network 100 may include a continuous protection data manager 112 configured to handle or manage backups of databases that are stored with or maintained by the database service 110. The backups may be maintained by one or more data storage services. The continuous data protection manager 112 may manage snapshots from the database service (e.g., in a native format illustrated as 144) as well as change log data (e.g., in a native format illustrated as 154) from the database service 110, in some embodiments. In at least some embodiments, a storage node may convert the change log data, from a format native to the database service to a non-native format, prior to providing the change log data to the continuous data protection manager 112.

In some embodiments, the data storage services may include a snapshot data store 142 and a change log archive data store 152. The snapshot data store 142 may be configured to store complete backups of partitions (e.g., partitions 124A-N) of the database at a particular point-in-time. For example, a particular snapshot stored at the snapshot data store 142 may be generated at a particular point-in-time such that the data in the particular snapshot is at the state in which the database existed at that particular point-in-time. In other embodiments, the database service 110 may be configured to store current or active data for the database such that data of the partition of the database is the most recent version of the data. The change log archive data store 152 may be configured to store logs 152 indicating changes, mutations or events that occur with respect to the database or any data corresponding to the database managed by the database service 110.

In at least some embodiments, archives may be immutable. In some examples, immutable archived data may not be changed or edited, but only read or deleted. In some examples, archived snapshots or change log data may be not be changed or edited, but only read or deleted, in durable storage (e.g., storage service 290), for example.

In various embodiments, the components illustrated in FIG. 1 may be implemented directly within computer hardware, as instructions directly or indirectly executable by computer hardware (e.g., a microprocessor or computer system), or using a combination of these techniques. For example, the components of FIG. 1 may be implemented by a system that includes a number of computing nodes (or simply, nodes), in one embodiment, each of which may be similar to the computer system embodiment illustrated in FIG. 12 and described below. In one embodiment, the functionality of a given system or service component (e.g., a component of database service 110) may be implemented by a particular node or may be distributed across several nodes. In some embodiments, a given node may implement the functionality of more than one service system component (e.g., more than one data store component, such as snapshot data store 142 or change log archive 152).

Database service 110 may include various types of database services, in embodiments (e.g., relational and non-relational) for storing, querying, and updating data. Such services may be enterprise-class database systems that are highly scalable and extensible. In one embodiment, queries may be directed to a database in database service 110 that is distributed across multiple physical resources (e.g., computing nodes or database nodes), and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service 110 may also be any of various types of data processing services to perform different functions (e.g., query or other processing engines to perform functions such as anomaly detection, machine learning, data lookup, or any other type of data processing operation). Various other distributed processing architectures and techniques may be implemented by database service 110 (e.g., grid computing, sharding, distributed hashing, etc.) in another embodiment.

In one embodiment, clients 160 may encompass any type of client configurable to submit network-based requests to provider network 100 via network 170, including requests for database service 110 (e.g., to query a database managed by the database service 110) or data storage service(s) (e.g., a request to create, read, write, obtain, or modify data in data storage service(s), etc.). For example, in one embodiment a given client 160 may include a suitable version of a web browser, or may include a plug-in module or other type of code module configured to execute as an extension to or within an execution environment provided by a web browser. Alternatively, in a different embodiment, a client 160 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 160 may be an application configured to interact directly with provider network 100, in one embodiment. In one embodiment, client 160 may be configured to generate network-based services requests according to a Representational State Transfer (REST)-style network-based services architecture, a document- or message-based network-based services architecture, or another suitable network-based services architecture.

In one embodiment, a client 160 may be configured to provide access to provider network 100 to other applications in a manner that is transparent to those applications. For example, client 160 may be configured to integrate with a database on database service 110. In such an embodiment, applications may not need to be modified to make use of the storage system service model. Instead, the details of interfacing to the database service 110 may be coordinated by client 160.

The clients 160 may communicate with the database service 110 from within the provider network 100, in some embodiments. For example, the clients 160 may be implemented on computing nodes of a computing service offered by the provider network 100. The clients 160 may convey network-based services requests to and receive responses from provider network 100 via network 170, in one embodiment. In one embodiment, network 170 may encompass any suitable combination of networking hardware and protocols necessary to establish network-based-based communications between clients 160 and provider network 100. For example, network 170 may encompass the various telecommunications networks and service providers that collectively implement the Internet. In one embodiment, network 170 may also include private networks such as local area networks (LANs) or wide area networks (WANs) as well as public or private wireless networks. For example, both a given client 160 and a provider network 100 may be respectively provisioned within enterprises having their own internal networks. In such an embodiment, network 170 may include the hardware (e.g., modems, routers, switches, load balancers, proxy servers, etc.) and software (e.g., protocol stacks, accounting software, firewall/security software, etc.) necessary to establish a networking link between given client 160 and the Internet as well as between the Internet and provider network 100. It is noted that in one embodiment, clients 160 may communicate with provider network 100 using a private network rather than the public Internet.

The clients 160 may send a request to perform an operation to respective databases managed by the database service 110. For example, a given client 160 may send a PUT (or SET) command and corresponding data to request that the data be stored in the database at the database service 110. In another example, a given client 160 may send a CHANGE (or UPDATE) command and corresponding data to request that some data existing in the database at the database service 110 be changed based on the sent data. In yet another example, a given client 160 may send a DELETE (or REMOVE) command and identify data to request that the data existing in the database at the database service 110 be deleted or removed from the database and the database service 110. In other embodiments, a given client 160 may provide another command to perform some operation to the data stored in the database at the database service 110.

The database service 110 may be configured to maintain a backup system for partitions of databases managed by the database service 110. In some embodiments, the backup system may perform backups for single partitions of the databases or single-partition databases. In other embodiments, the backup system may perform backups for multiple partitions of the databases. The backup system may include a continuous data protection manager 112 configured to manage change logs and backups or snapshots of partitions of the databases stored in storage services of the database service 110. The continuous data protection manager 112 may generate a complete backup of a partition of the database (e.g., a snapshot) by applying logs to a closest existing snapshot. A periodicity at which the continuous data protection manager 112 generated backups may be based on the amount of logs accumulated for the partition or table. Periodicity may be based on an amount of time, in some embodiments. In some embodiments the periodicity may be based on an amount of changes or a period of time between backups, whichever happens sooner.

A change log (e.g., change log data 154) may indicate one or more changes to the database over a period of time or sequence of events. For example, the change log (e.g., change log 154) may indicate that data was added, changed or deleted from the database in a period of time. The change log may be stored at a log store (e.g., change log data store 604 in FIG. 6, described below, or change log archive 152). The log store may be accessible to the database service 110 and the continuous data protection manager 112. In some embodiments, the database service 110 may generate or update a log segment in response to an event at the database. For example, the database service 110 may indicate in the log segment that the event occurred, and some data in the database has changed. The log segment may include metadata indicating a sequence start identifier, a sequence end identifier, a time start identifier, a time end identifier, one or more checksums, a previous cumulative size of the change log, a lineage of the log segment, or any combination thereof. The sequence start identifier may indicate a sequence number for a first event in a sequence of events that is logged in the log segment. The sequence end identifier may indicate a sequence number for a last event in the sequence of events that is logged in the log segment. The time start identifier may indicate a timestamp for the first event in the sequence of events that is logged in the log segment. The time end identifier may indicate a timestamp for the last event in the sequence of events that is logged in the log segment. The one or more checksums may correspond to the data in the partition of the database, the log segment, etc. The one or more checksums may be used by the continuous data protection manager 112 or the database service 110 to determine whether application of at least a portion of the log segment or the change log to the database has resulted in the correct data being restored or retrieved. The previous cumulative size of the change log may indicate a size of the change log prior to the respective log segment. The lineage of the log segment may indicate parent or child partitions associated with the log segment.

The log segment may be added to the change log in response to satisfying one or more criteria. In some embodiments, the log segment may be added to the change log based on a determination that the log segment satisfies a size threshold. For example, the database service 110 may add events to the log segment continuously until the log segment reaches a specified size or a size limit. After the log segment is the specified size, the log segment may be committed to the change log. In other embodiments, the log segment may be added to the change log based on a determination that a number of operations tracked or identified in the log segment satisfies a threshold number of operations. For example, the database service 110 may perform multiple CHANGE operations to the database. The multiple CHANGE operations on a data entry may require a higher amount of storage space in the log segment despite the storage space used by the data entry has not significantly increased. The database service 110 may track a number of operations and corresponding types and save the number of operations and corresponding types to the log segment.

The database service 110 may receive an indication that an event has occurred with a partition of a given database managed by the database service 110. In some embodiments, the event may be based on a request to perform an operation sent from a given client 160 to the database service 110. For example, the event may be based on a PUT command, a CHANGE command, a DELETE command or any other type of request from the given client 160. The event may also indicate a type of the operation, such as PUT, CHANGE, DELETE, etc. The event may also indicate data that used to perform the operation. For example, the indicated data may include new data to be stored with the PUT command, changed data to be updated with the CHANGE command, data to be deleted with the DELETE command.

The clients 160 may send a request to the database service 110 to generate a backup of a partition of a database. The database service 110 may also implement timed, periodic or continuous backups automatically or after scheduling by the clients 160. In some embodiments, a backup of the partition the database (e.g., a snapshot) may be generated at least in part by the continuous data protection manager 112. The continuous data protection manager 112 may have access to the database stored at the database service 110, the snapshot data store 142 and the change log archive 152.

In an example, the continuous data protection manager 112 may determine that the snapshot type is a log-based snapshot. The continuous data protection manager 112 may generate data that indicates a point in the change log that, when used in conjunction with a stored snapshot, may be used to represent a snapshot of the partition of the database. The continuous data protection manager 112 may store the generated data as metadata in the snapshot data store 142.

In some embodiments, the log-based snapshot may be used to generate a full snapshot based on applying at least a portion the change log to a stored snapshot. The log-based snapshot may indicate the portion of the change log that may include logged events that have occurred since generation of the stored snapshot through the current time. The continuous data protection manager 112 may retrieve the stored snapshot from the snapshot data store 142, such as by sending a request to the snapshot data store 142 for the previous snapshot. The continuous data protection manager 112 may retrieve the change log from the change log archive 152, such as by sending a request to the change log archive 152 for the change log. The continuous data protection manager 112 may be configured to apply the change log to the stored snapshot. In some embodiments, applying the change log to the stored snapshot includes starting with the stored snapshot and stepping through the change log and reenacting events included in the change log in chronological order to the stored snapshot. In other embodiments, applying the change log to the stored snapshot includes starting with the stored snapshot and stepping through the change log and undoing events included in the change log in reverse chronological order.

In at least the embodiment illustrated in FIG. 1, the system may instruct components of the system (e.g., forward/reverse converter 206 in FIG. 2, described below) to convert partition data in a native format to a preferred format (e.g., a binary and text interchangeable format, a typed JSON-superset, etc.) and then persist the preferred format to backup storage (e.g., snapshot data store 142) distinct from the source storage system (e.g., database service 110). In embodiments, the conversion from the service or native format is not done directly into the preferred format. In some embodiments the native format is converted to an intermediate model (e.g., a Java data type) first and then serialized into the preferred format.

Figure 2:
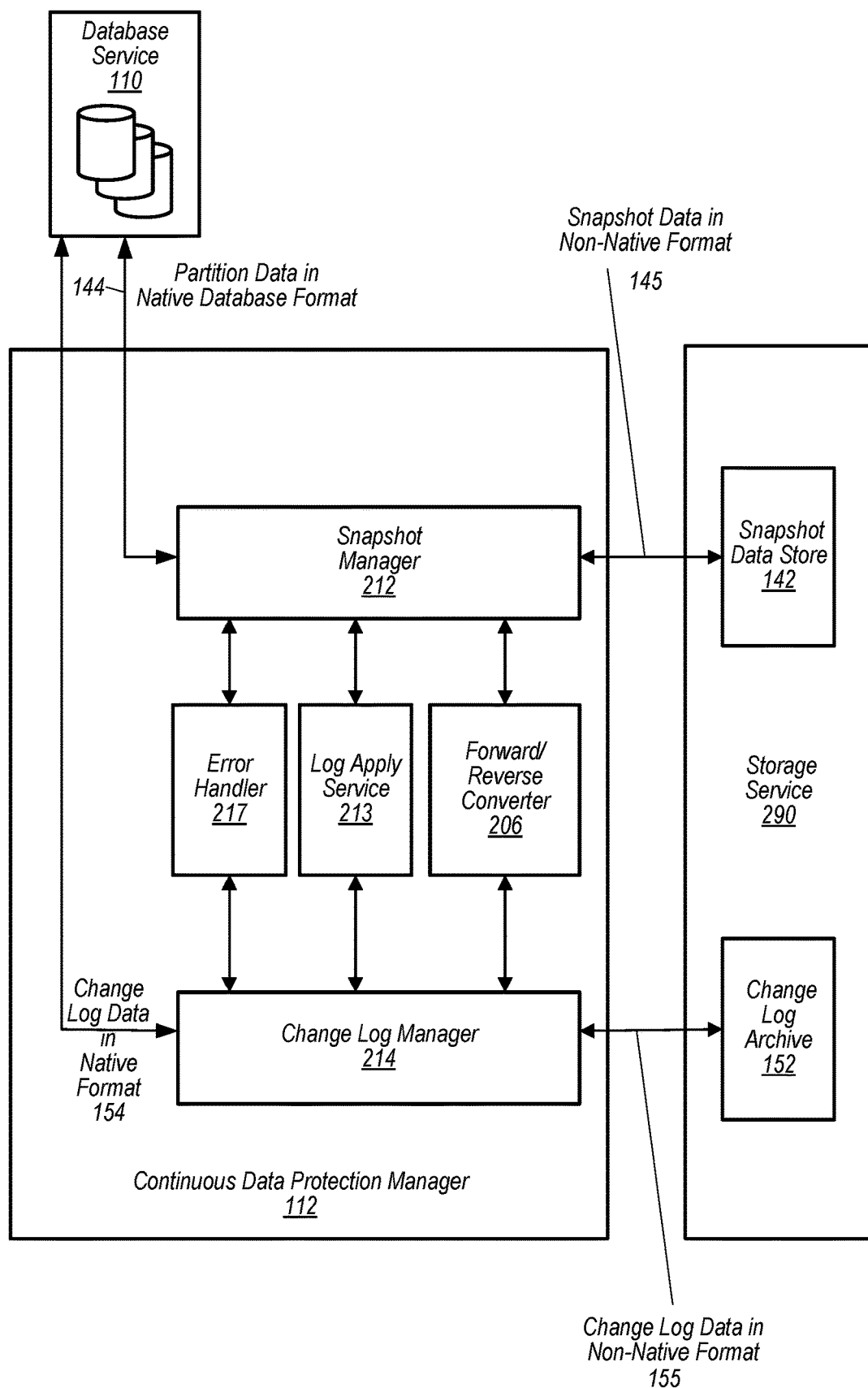
FIG. 2 is a data flow diagram illustrating logical relationships between a snapshot manager, a change log manager, and associated data within the context of a continuous data protection manager, according to some embodiments.
Figure 3:
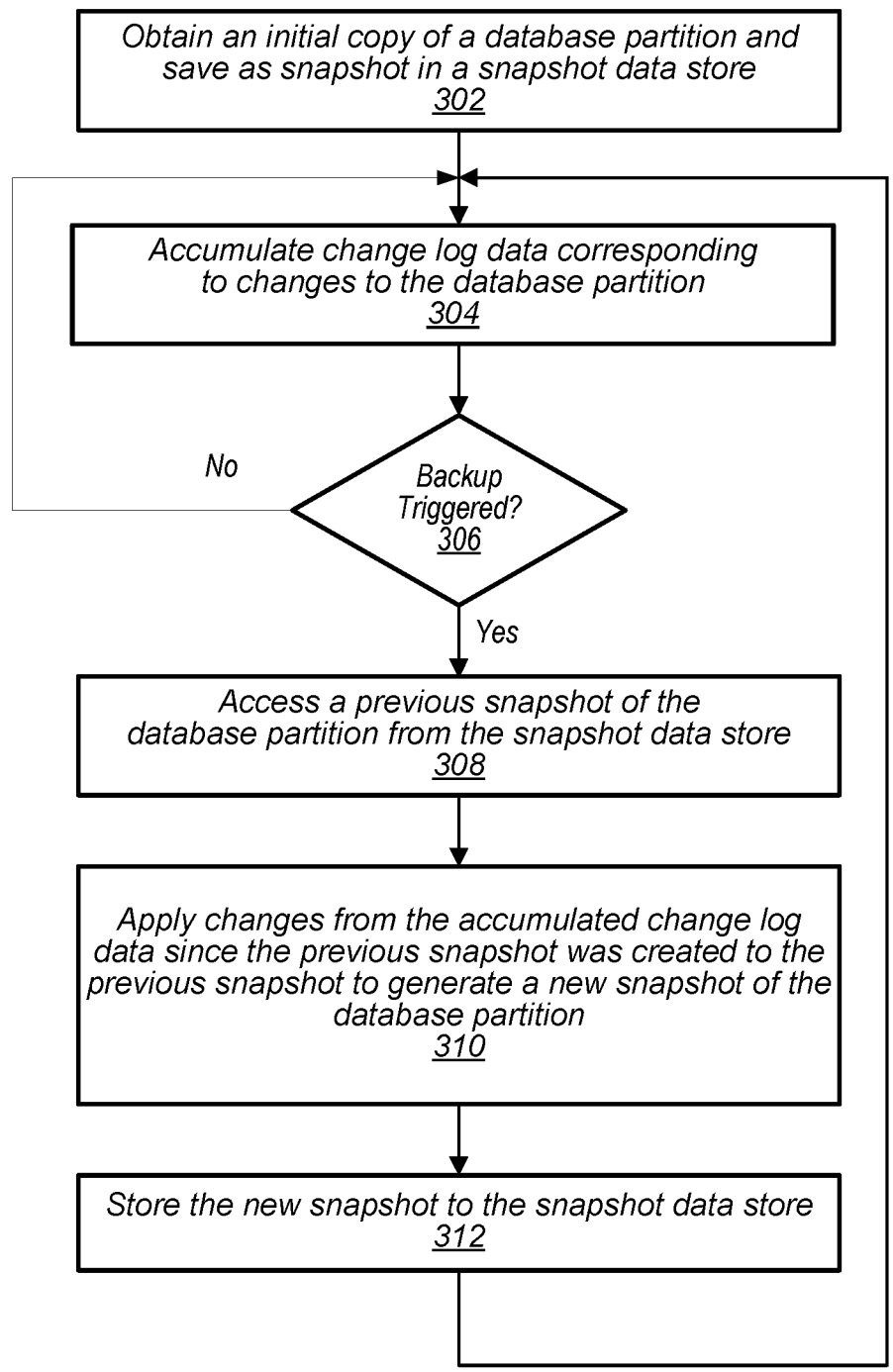
FIG. 3 is a flow chart illustrating a technique for continuous data protection, according to some embodiments.

FIG. 2 is a data flow diagram illustrating logical relationships between a snapshot manager, a change log manager, and associated data within the context of a continuous data protection manager 112, according to some embodiments. The snapshot manager 212, and a change log manager 214 depicted in FIG. 2 illustrate components of the continuous data protection manager 112 also depicted in FIG. 1. These managers, in combination with the other depicted components may perform one or more of the steps of the processes illustrated in FIGS. 3-5, in embodiments. Different components (e.g., illustrated or non-illustrated components) may perform various of the steps, in various embodiments, without departing from the scope of this disclosure. FIG. 3 is a flow chart illustrating a technique used for continuous data protection, according to some embodiments.

An initial copy of a database partition is obtained and saved as a snapshot in a snapshot data store (block 302). For example, in at least the illustrated embodiment of FIG. 2, continuous data protection manager 112 receives partition data 144 (e.g., in a format native to the database), for example, obtaining a copy (e.g., a full partition snapshot). The copy may be from a scan or an export of a replica of the database partition, for example. The snapshot manager 212 may store the initial copy of the partition data (e.g., from a replica) in a format native to the database to a data store (e.g., snapshot data store 142 in storage service 290).

In some embodiments, the continuous data protection manager may direct a process external to the continuous data protection manager (e.g., a database service process) to obtain a copy of the database partition and to store the copy to durable storage (e.g., in either of a native or non-native format).

In some embodiments, the snapshot may be converted from a native format to a non-native format. In an example, forward/reverse converter 206 may convert the initial copy of the partition data stored in snapshot data store 142 into a snapshot in a non-native format 145, for example, forward converting each item of the full partition snapshot to a non-native format, and then store the converted items to durable storage (e.g., to snapshot data store 142, or another data store distinct from snapshot data store 142) as partition snapshot data in a non-native format. In some such embodiments, the durable storage may be used at part of a transport mechanism to transport snapshots obtained in a native format to the continuous data protection manger 112 in a non-native format, with the native format snapshots being deleted from durable storage subsequent to conversion. In at least some embodiments, forward/reverse conversion may be performed by a forward/reverse converter process of the database service that is not part of the continuous data protection manager 112.

In embodiments, the conversion process may include forward transforming the replica from the native format into an intermediate object (e.g., an intermediate JAVA based record) to represent the data in-memory (an in-memory representation) before continuing to transform the native-format record to the non-native format.

In embodiments, a non-native format may be a format that provides dual-format interoperability (e.g., applications can seamlessly consume the data in either its text or binary forms without loss of data fidelity) which enables users to take advantage of the ease of use of a text format while capitalizing on the efficiency of a binary format. For example, some forms of dual-format interoperability make the text form easy to prototype, test, and debug, while the binary format saves space and parsing effort.

A non-native format may include a rich type system, e.g., extending JSON's type system, adding support for types suitable for a wider variety of uses, including precision-sensitive applications and portability across languages and runtimes, in some embodiments. In addition to strings, Booleans, arrays (e.g., lists), objects (e.g., structs), and nulls, the non-native format may add support for arbitrary-precision timestamps, embedded binary values, and symbolic expressions. Some embodiments of a non-native format may expand JSON's number specifications by defining distinct types for arbitrary-size integers, IEEE-754 binary floating-point numbers, and infinite-precision decimals.

A non-native format may include Ion, a richly-typed, self-describing, hierarchical data serialization format that provides interchangeable binary and text representations, in embodiments.

In some embodiments, a non-native format is a self-describing format, giving its readers and writers the flexibility to exchange data without needing to agree on a schema in advance. For example, in some embodiments, a self-describing format may not require external metadata (i.e. a schema) in order to interpret the structural characteristics of data denoted by the format. For example, the payloads of the self-describing format may be free from build-time binding that inhibits independent innovation and evolution across service boundaries (data may be sparsely encoded and the implicit schema may be changed without explicit renegotiation of the schema among all consumers).

Continuing with FIGS. 2 and 3, change log data corresponding to changes to the database partition may be accumulated (block 304), to change log storage, for instance. For example, change log storage may include any one of the database service 110, or the change log manager 214, or a change log data store 604 (FIG. 6, described below) may accumulate the change log data, or the change log data may be accumulated to durable storage (e.g., change log archive 152 of storage service 290). The change log data may be accumulated in a format native to the database from which the change log data is obtained, or may be converted into a non-native format prior to accumulation, in various embodiments. In some embodiments, the change log data may be accumulated in a process that continues during one or more of the other steps of the process. For example, the accumulation of the change log data (block 304) may continue during other steps such as any or all of steps 306-312.

If a backup is not triggered (block 306, no) the system may continue to accumulate change log data. When a backup is triggered (block 306, yes) a previous snapshot of the database partition may be accessed (block 308) from the snapshot data store 142, by the snapshot manager 212, for example. In some embodiments, instead of using a previous snapshot of the database partition (e.g., from durable storage), the system may obtain a copy of the database partition (e.g., from a replica of the partition). Changes from the accumulated change log since the previous snapshot was created may be applied (block 310) to the previous snapshot to generate a new snapshot of the database partition. For instance, the snapshot manager 212 may call the log apply service 213 to apply the accumulated change log. Log-apply may sometimes be referred to herein as materialization. Materialization may include starting with one or more snapshots, applying the corresponding logs, and creating a coherent set of artifacts that represent the requested backup, for example. The results of materialization may be put directly into a database service table or a materialized set of artifacts may be stored to durable storage, in embodiments.

The snapshot manager 212 may store (block 312) the new snapshot to the snapshot data store 142. The system may return to accumulating change log data (block 304) in at least the illustrated embodiment. In some embodiments, accumulation may not be interrupted, and continues as a parallel process.

In some embodiments, a first copy or a snapshot of a partition is stored to durable storage (e.g., snapshot datastore 142) and change log data (e.g., from the database service) may be continuously archived (e.g., to change log archive 152) to durable storage. At some point, (e.g., when the change log archive gets to a certain size threshold, or some time threshold) the change log data is downloaded from the archive and used (e.g., via a log apply function) to generate a new snapshot, based on the first snapshot. This process may iterate, at least as long as changes are being made to the partition or database, for example.

In at least the illustrated embodiments, either of snapshot manager 212 or change log manager 214 may call an error handler 217 to trigger any of various error routines such as retrying the conversion/reverse-conversion process, retrying the process using a different partition replica, retrying the process on different host machine, reporting failure, flagging the error and continuing, etc.

In at least the illustrated embodiments, a checksum generator (not illustrated) may generate a checksum on the snapshot in the non-native format prior to upload of the snapshot to the snapshot data store 142. In embodiments, the uploaded data may also be processed with a streaming checksum. In some embodiments, the checksum is performed after the upload is complete. The checksum may help protect integrity of the overall process while uploading the output file to storage, in embodiments. Some such features are useful when the entire data set cannot fit into memory (e.g., partitions).

Figure 4:
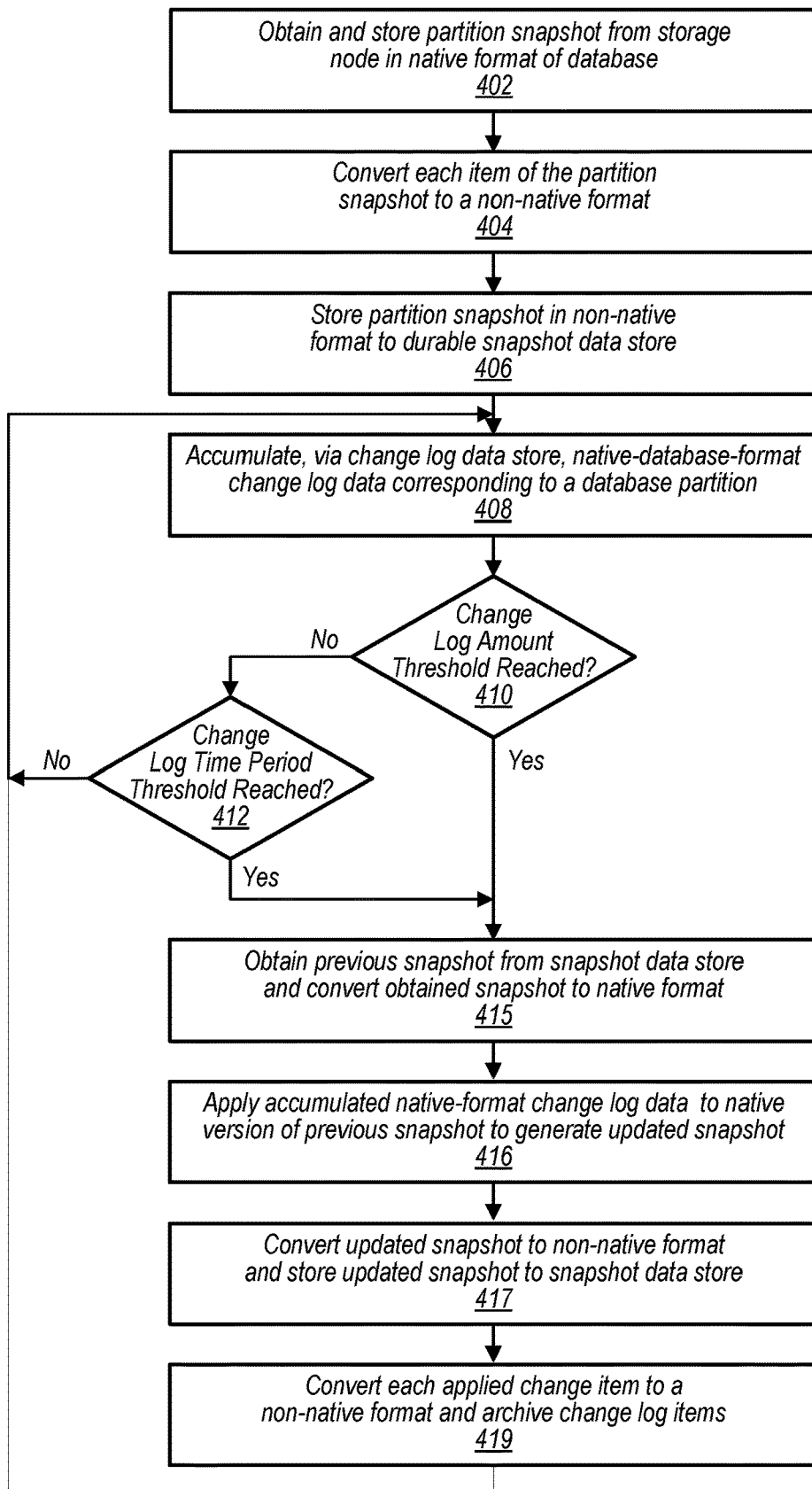
FIG. 4 is a flow chart illustrating a technique for continuous data protection according to some embodiments.
Figure 6:
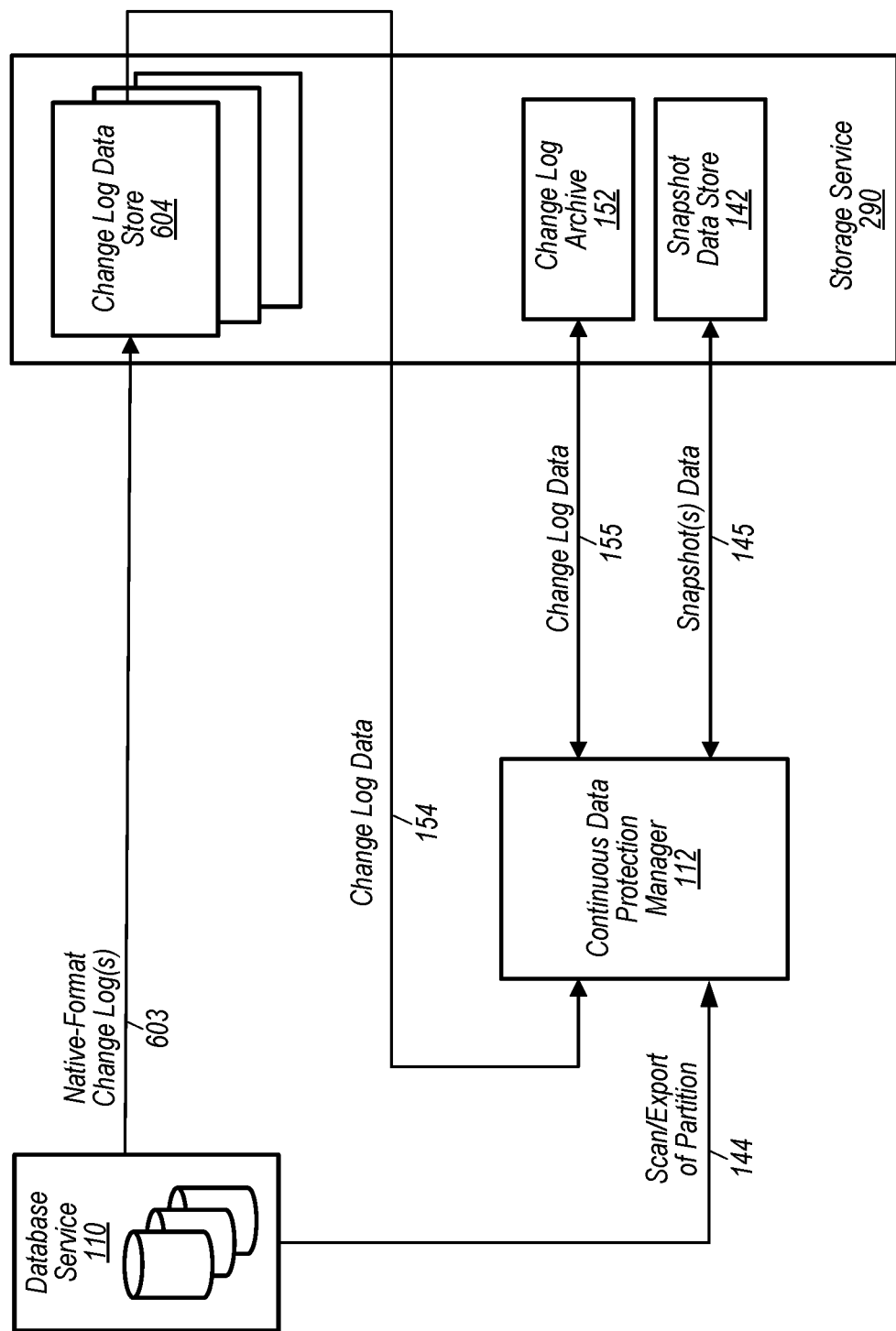
FIG. 6 is a data flow diagram illustrating a continuous data protection system with a continuous data protection manager and a streaming data service, according to some embodiments.

FIG. 4 is a flow chart illustrating a technique for continuous data protection according to some embodiments. FIG. 6 is a data flow diagram illustrating a continuous data protection system with a continuous data protection manager and a change log data store (e.g., a streaming data service data store), according to some embodiments.

The steps illustrated in FIG. 4 may be performed by various components of the systems described herein (e.g., components in continuous data protection system or service 112), or by components not illustrated herein, in some embodiments without departing from the scope of this disclosure. At least some of the illustrated steps may be performed by one or more of the components depicted in FIGS. 1-2 & 6. The following description will describe various components of FIG. 6 that implement the functionality described and illustrated in FIG. 4, in embodiments.

Partition data (e.g., 144) is obtained from a storage node in a storage format native to the database (block 402). The partition data may be read into memory (e.g., by forward/reverse converter 206) transforming the data to an in-memory format. A forward conversion process may be applied to convert each item of the in-memory partition data to a non-native format for the snapshot (block 404), by the forward/reverse converter 206, for example. A checksum may be generated for the snapshot, in embodiments. The partition snapshot may be stored (block 406) in a non-native format to a durable snapshot data store 142, by the snapshot manager 212 of the continuous data protection manager 112, for example.

Native-database-format change log data corresponding to a database partition is accumulated (block 408) via a change log data store 604. In some embodiments, change log data store 604 may be implemented in durable storage (e.g., of storage service 290). In some embodiments, change log data store 604 may be implemented externally to the storage service 290, by a data stream service that streams the changes, for example. In some embodiments, the database service 110 may provide the streams of change data. If a change log amount threshold is not reached (block 410) the continuous protection manager may determine whether a change log time period threshold has been reached (block 412). If the change log time period threshold is not reached, the process may return to the accumulation step at 408. But, if either of the change log amount threshold is reached (block 410, yes) or the change log time period threshold is reached (block 412, yes), the process may continue by obtaining (block 415) a previous snapshot from the snapshot data store 142 and converting the obtained snapshot to the native format (e.g., by forward/reverse converter 206 of the continuous data protection manager 112).

In some embodiments, instead of applying native format change log data to a native version of a previous snapshot to generate an updated snapshot, stored native format change log data may be converted to non-native format change log data and then may be log-applied to an existing snapshot in non-native format to generate the updated snapshot.

In some embodiments, the storage node may directly provide the change log data in the non-native format (e.g., instead of a conversion being performed by the continuous data protection manager 112).

At block 416, accumulated native-format change log data is applied to the native version of the previous snapshot to generate an updated snapshot (e.g., by the log apply service 213 of the continuous data protection manager 112). At 417, the updated snapshot is converted (block 417) to a non-native format and the updated snapshot is stored to the snapshot data store 142. At block 419, each applied change item is converted to a non-native format and archived to the change log archive 152 (e.g., by the change log manager 214 and the forward/reverse converter 206). The process may return to the accumulation step at block 408, in some embodiments.

FIG. 4 illustrates logical steps of a process that may be implemented in various different ways. For example, while the accumulation of change log data in block 408 is illustrated as a step that is performed prior to the applying of the accumulated change log data in block 416 and prior to the conversion of the updated snapshot in 417, and prior to the conversion of change items in block 419 in at least some embodiments, some of the functionality described in the steps 402-419 may be implemented by one or more processes (e.g., one process for each partition, or the like) and may be performed in parallel with the other steps of the process. For example, an instantiated process that is executing the accumulation of the change log data in block 408 may continue to accumulate the change log data while another process is converting change items to a non-native format as in block 419.

Figure 5:
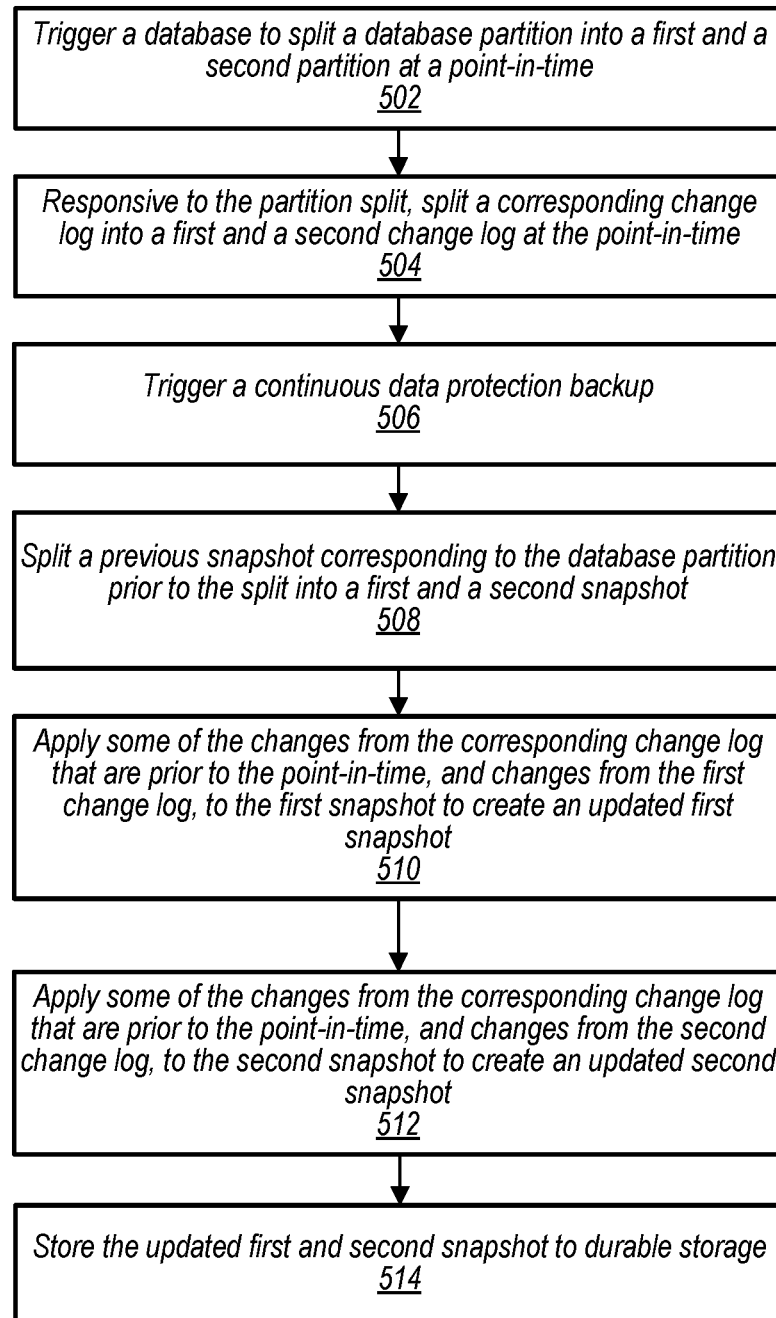
FIG. 5 is a flow chart illustrating a technique for continuous data protection during a partition split, according to some embodiments.

FIG. 5 is a flow chart illustrating a technique for continuous data protection during a partition split, according to some embodiments. The steps illustrated in FIG. 5 may be performed by various of the components depicted in FIGS. 1-2 and 6, 7 and 8, in embodiments. At block 502, a data base split procedure is triggered that splits a partition into a first and a second partition at a point-in-time (e.g., by the database service 110). Responsive to the partition split, a corresponding change log is split into a first and a second change log at the point-in-time (block 504). For example, the first change log includes changes since the split for the first partition, and the second change log include changes since the split for the second partition. At block 506, a continuous data protection backup is triggered (e.g., by continuous data protection manager 112). A previous snapshot corresponding to the database partition prior to the split is split into a first and a second snapshot (block 508).

At block 510, some of the changes from the corresponding change log that are prior to the point-in-time, as well as changes from the first change log, are applied to the first snapshot to create an updated first snapshot. Some of the changes from the corresponding change log that are prior to the point-in-time, as well as changes from the second change log, are applied to the second snapshot to create an updated second snapshot (block 512). In some embodiments, the updated first and second snapshots are stored (block 514) to durable storage (e.g., at the snapshot data store 142).

In some embodiments, logs and snapshots may be stored to durable storage in the native format and converted to the non-native format (e.g., on the fly) when needed. For example, native format change logs 603 may be stored to change log data store 604 in storage service 290 and then converted by continuous data protection manager 112 to the non-native format 155. Similarly, native format snapshots or copies of partitions may be stored to durable storage (e.g., snapshot data store 142, via continuous data protection manager 112 or via the database service, directly) and then converted to non-native snapshots. The non-native format changes may be log-applied to a prior snapshot in order to generate another snapshot (e.g., for an on-demand backup or to create a periodic snapshot). The change logs in native-format, may remain in durable storage, in embodiments.

In some embodiments, the first and second change logs are stored to a change log archive 152.

In at least some embodiments, a checksum and the non-native format (e.g., logical format) snapshot of the partition may be sent to the snapshot data store (e.g., data store 142). In some embodiments, the system may send the snapshot without the checksum.

The recipient of the snapshot (e.g., snapshot data store 142) may use the checksum to verify whether the snapshot has been received without error and send a message back to the snapshot manager 212 indicating success or not. For example, the snapshot manager 212 receives back the checksum conformation, and invokes an error handler 217 or reports a successful snapshot. The error handler 217 may perform any of various handling processes, such as retrying the transmission of the snapshot, encoding the failure, reporting the failure and continuing, etc. The system may respond to a successful checksum by marking the process successful, in embodiments.

Figure 7:
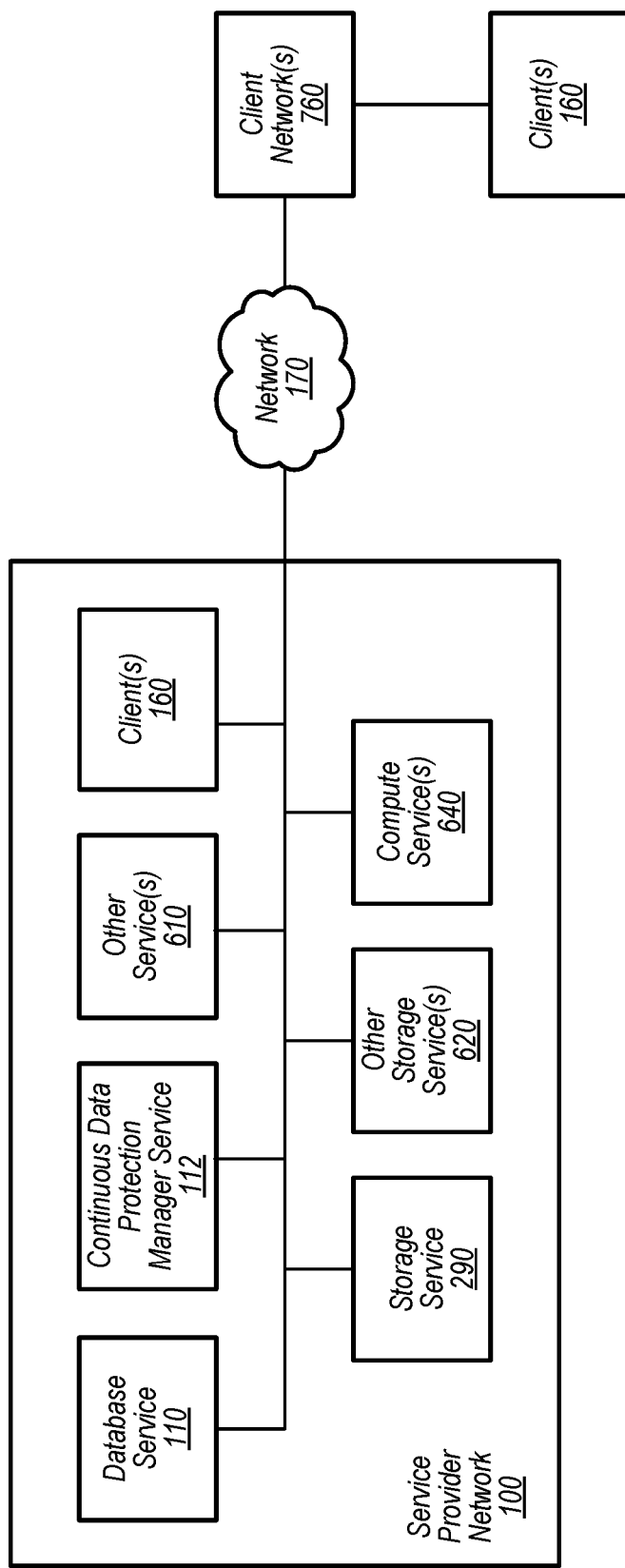
FIG. 7 is a block diagram illustrating a service provider network that implements a continuous data protection manager service, according to some embodiments.

FIG. 7 is a block diagram illustrating a service provider network that implements a continuous data protection manager service, according to some embodiments. Depicted is a continuous data protection manager service 112 similar to those illustrated in FIGS. 1, 2, and 6 that may perform some of the steps illustrated in at least FIGS. 3-5. The continuous data protection manager service 112 is illustrated as part of service provider network 100 that includes database service 110, storage service 290, computer service 640, clients 160 as well as other storage services 620 and other services 610. In at least the illustrated embodiment, the service provider network 100 is communicatively coupled to client networks 760 and clients 160 via network 170. Service provider network 100 may provide one or more services to a plurality of distinct customers, each distinct customer comprising a distinct customer network. One or more of the components in FIG. 7 may be implemented by one or more of the computing nodes 1200 illustrated in FIG. 12.

Figure 8:
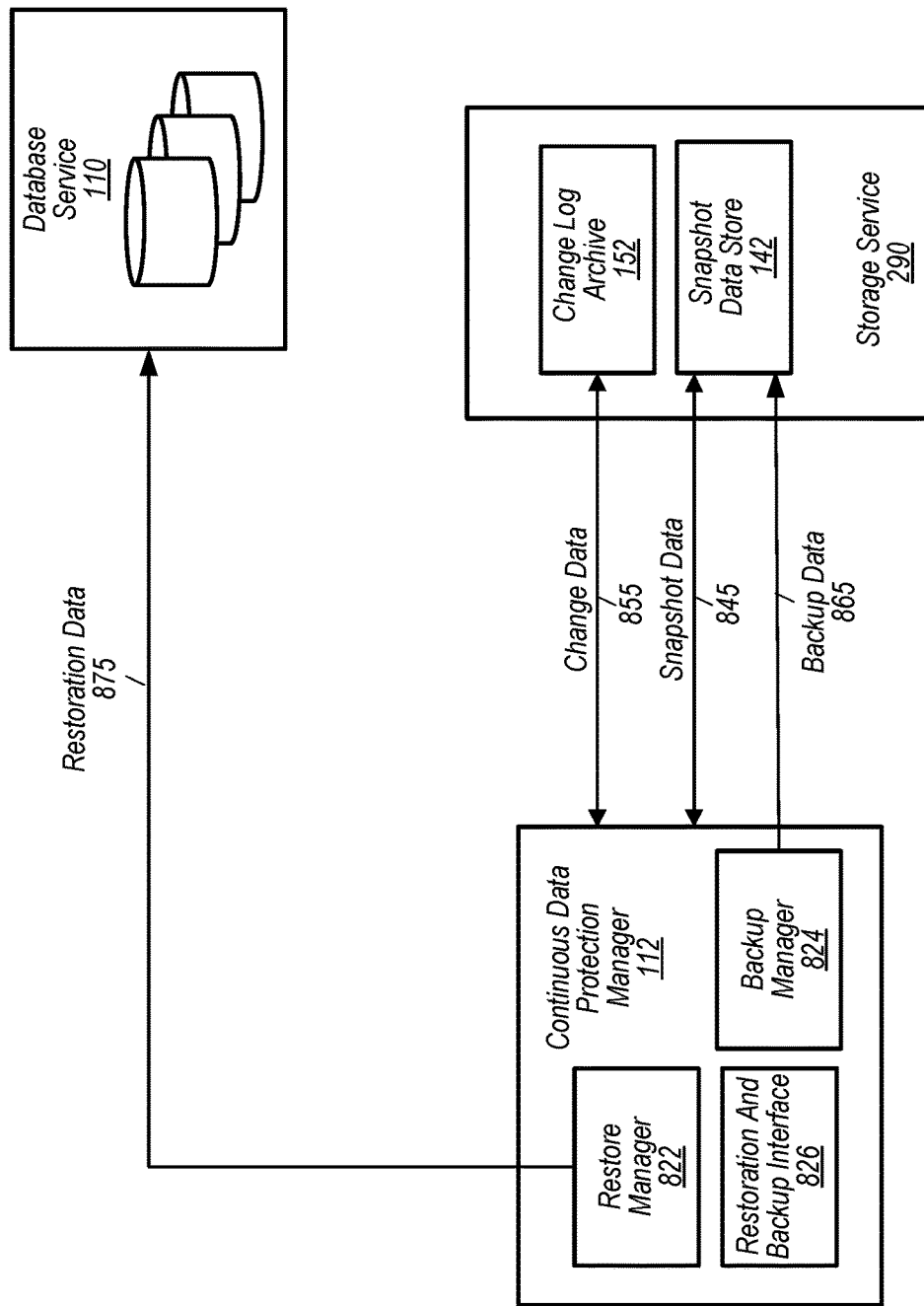
FIG. 8 is a block diagram illustrating logical relationships between components of a continuous data protection manager, a database service, and a storage service, according to some embodiments.

FIG. 8 is a block diagram illustrating logical relationships between components of a continuous data protection manager, a database service, and a storage service, according to some embodiments. In at least the illustrated embodiment, the system has already obtained initial copies of the partitions and accumulated changes log data, as described above.

Figure 9:
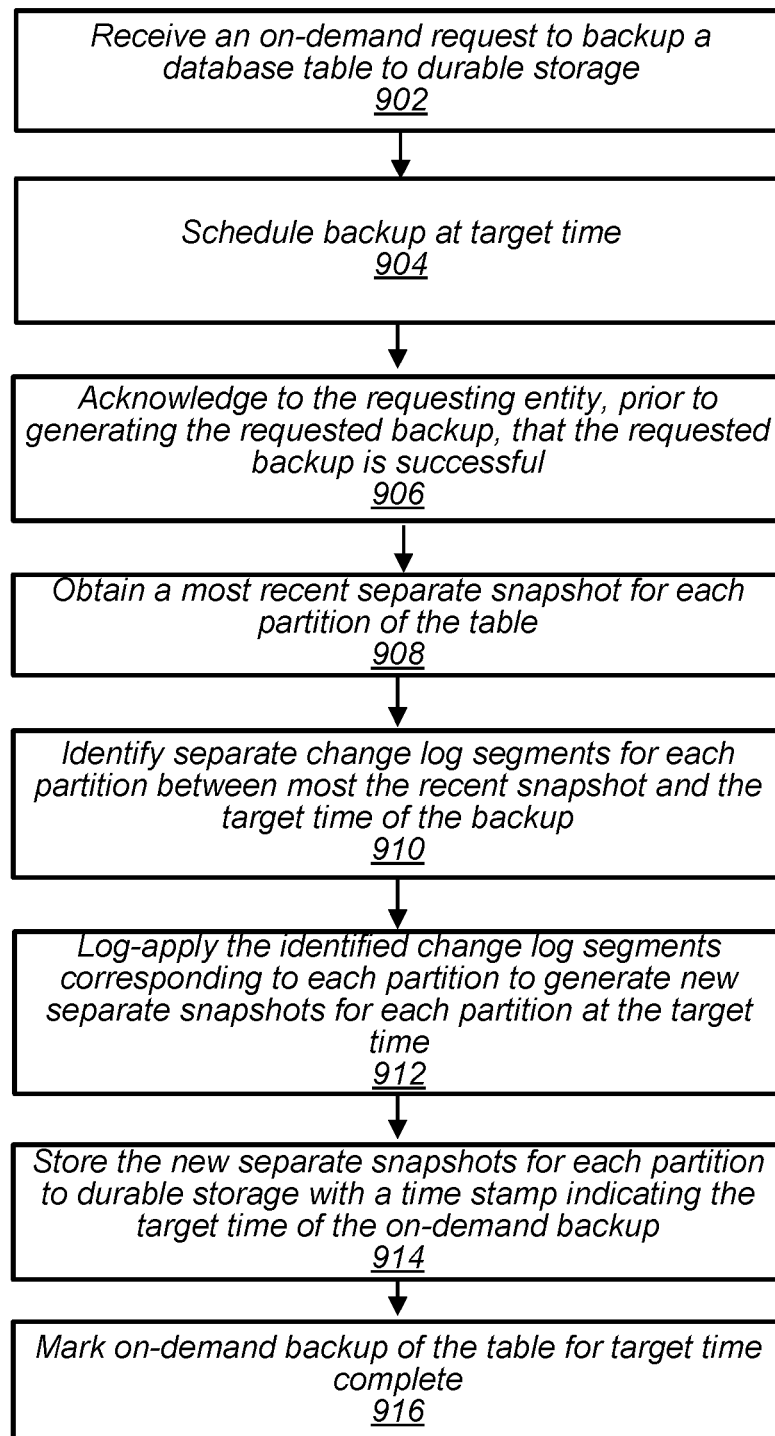
FIG. 9 is a process diagram illustrating a logical flow of an on-demand backup, according to some embodiments.
Figure 10:
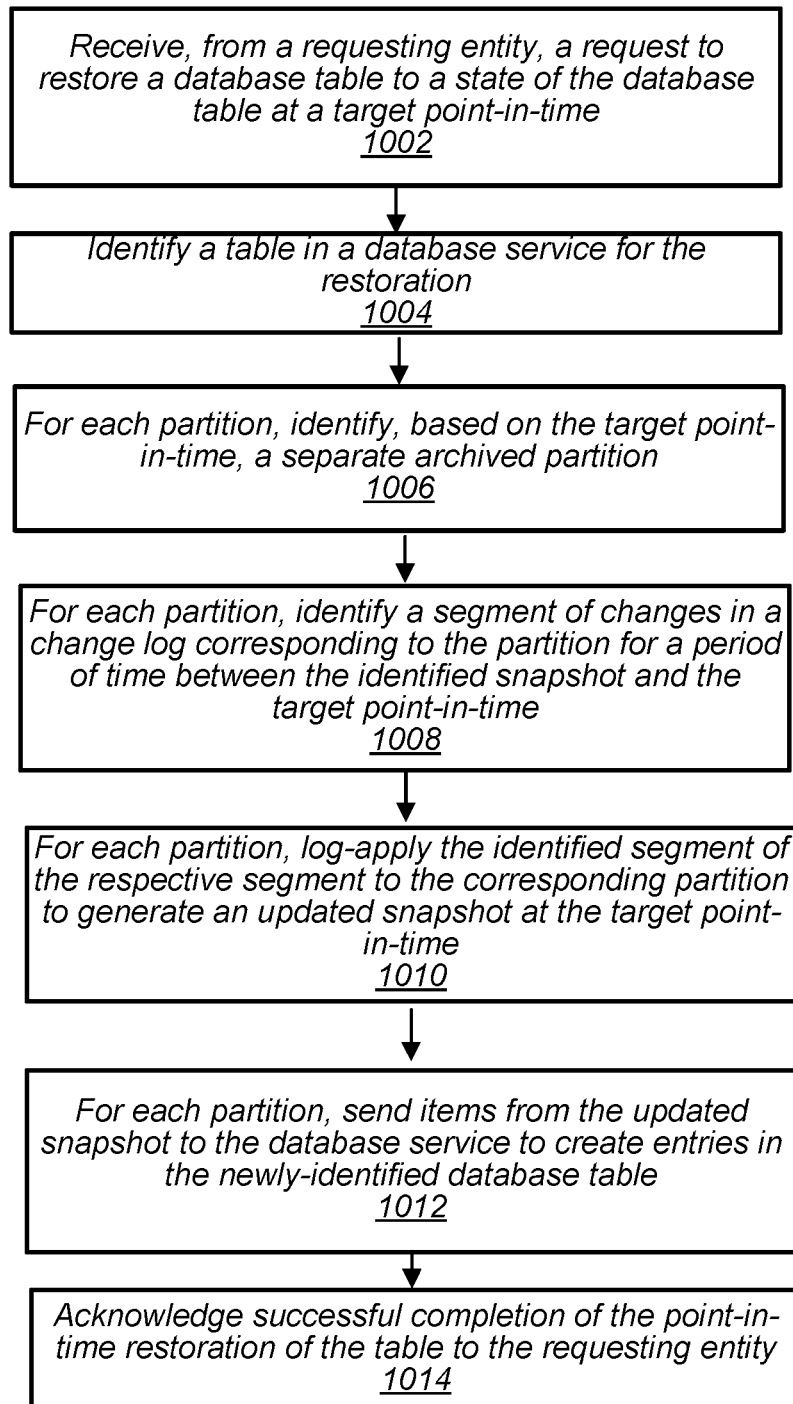
FIG. 10 is a process diagram illustrating a logical flow of a point-in-time restoration, according to some embodiments.

In some embodiments, the illustrated components may perform one or more of the steps depicted in FIGS. 9 and 10. Other components may perform the steps. For example, some of the steps depicted in FIGS. 9 and 10 may be performed by components of the continuous data protection manager 112 depicted in FIG. 2.

Illustrated is, a database service 110, change log archive 152, and snapshot data store 142, in storage service 290. Various components of the continuous data protection manager 112 may direct the data transfers, in some embodiments. Various components of continuous data protection manager 112 may obtain and/or write the change data 855 (in native or non-native format), and/or the snapshot data 845 (in native or non-native format) from/to the storage service 290. Backup data 865 may be stored to snapshot data store 142, in embodiments.

On-Demand Backup

FIG. 9 is a process diagram illustrating a logical flow of an on-demand backup request, according to some embodiments. In some embodiments, the depicted process illustrates that independent partition copies are coalesced into a coherent backup copy of a table for a particular point-in-time, at the time of the on-demand backup, for example. In some embodiments, the target time for the on-demand backup may be a time in the future (or past), with respect to when the request backup was requested. On-demand backups of the full database table may be made for a variety of reasons, not limited to, but including compliance, or to support subsequent restoration, for example.

In at least the illustrated embodiment, an on-demand request to backup a database table to durable storage is received (block 902), by restoration and backup interface 826, from a requesting entity, such as a client device, for example. A target on-demand time associated with the request is stored and the requested backup is scheduled (block 904) as an asynchronous process, by the continuous data protection manager 112, for example. The process may be asynchronous in that an acknowledgement that the requested backup has been successful may be sent to the requesting entity prior to actually generating the requested backup (block 906). This relatively quick response may be an unexpected result, especially for clients requesting backup of a large database table at least because a scanning-type backup of a large database table—a prior way of performing a backup of an entire table—takes a relatively longer amount of time to complete. The system may be able to respond with the acknowledgement of success prior to performing the backup because the system has all the data it needs to create the backup, in embodiments. For example, a combination of existing snapshots and change log data may be used to generate the requested on-demand backup after the confirmation of success has been sent. Some such workflows may be beneficial for a variety of scenarios, such as, but not limited to, creation of compliance backups that are required on some schedule, but are not necessarily used right away, for example.

In some embodiments, a backup may be deleted, overwritten or otherwise removed from the system without ever being materialized. For instance, a backup may be requested and deleted, without being exported or used in a restore, and without the backup ever being materialized, in at least some embodiments.

A most-recent snapshot for a partition of the table may be obtained for each partition (block 908), from the snapshot data store 142, by the snapshot manager 212 (see FIG. 2) of the continuous data protection manager 112, for example. Separate sets of changes to the partition are identified from change logs for each partition between the most recent snapshot and the target time of the backup (block 910), by the change log manager 214 (see FIG. 2) of the continuous data protection manager 112, for example.

The identified change logs corresponding to the partition may be log-applied to the most recent snapshot for each partition, to generate an updated snapshot of the partition in a state at the target time (block 912), by log apply service 213 (see FIG. 2) of the continuous data protection manager 112, for example. The generated snapshot for each partition may be stored to durable storage with a time stamp indicating the target time of the on-demand backup (block 914), by the snapshot manager 212 of the continuous data protection manager 112, for example. Block 916 illustrates the system may mark the on-demand backup for the target time complete.

In embodiments, the resulting table may have a different partitioning than the prior table. Partitions may be merged or split for example.

Some embodiments, herein, describe techniques that operate on distinct partitions of a table at distinct times. For example, a first partition of a table (e.g., a relatively active table) may accumulate changes to the first partition in a change log more quickly than a second partition accumulates changes to the second partition, and the system may dynamically respond to each of those partitions differently, by performing updates to snapshots or producing backups of the more active partition more often and at different times from updates or backups of the less-active second partition of the same table.

In at least the illustrated embodiment, a technique for producing an on-demand backup for an entire table that includes a number of distinct partitions that each have updated snapshots or backups at distinct times, is disclosed. In some embodiments where distinct partitions of a table have durably-stored snapshots that were generated at distinct times from one another, the system may use a log-apply service to apply logs for the respective partitions to the corresponding snapshots to bring the state of the data for each partition to a common point-in-time—an aligned-in-time set of snapshots for the partitions of the table. A request for an on-demand backup may inherently indicate that a target time for the requested backup of the table is when the request is made or received. In some embodiments, an on-demand backup may be requested for another time, the on-demand backup request may indicate a time in the future for performing the backup, for example.

Figure 11:
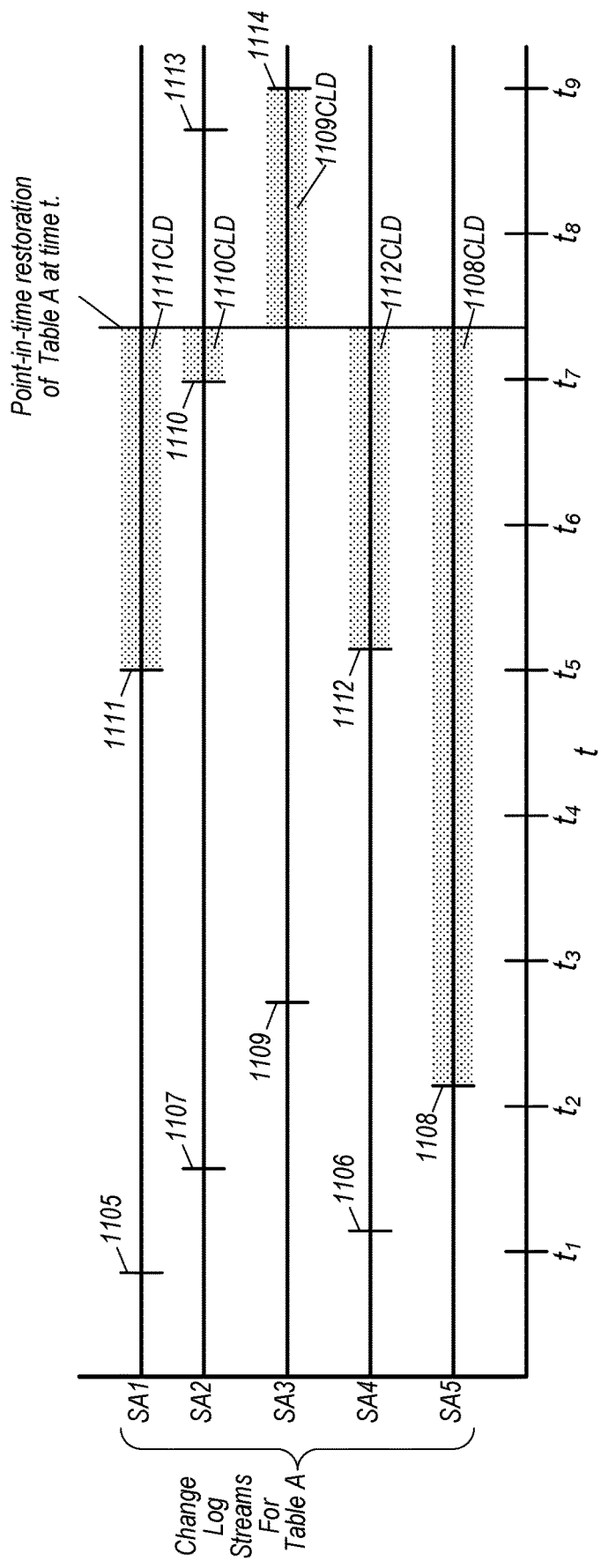
FIG. 11 is a chart illustrating creation of an aligned set of distinct snapshots of a table, according to some embodiments.

FIG. 11 illustrates, among other things, timing characteristics associated with change log streams of a system that implement the techniques described herein, in embodiments. For example, the illustrated example of change log streams for table A depict five change log streams (SA1-SA5) with snapshots 1105-1114 taken at various times t. Also illustrated is a target time of a requested point-in-time restoration of table A, and change log data 1108CLD-1111CLD for the periods of time between the last snapshot for the respective change stream and the target time. FIG. 11 illustrates that the system may use the change log data particular to each change log stream to bring the snapshot for that partition to a state at a time common for each of the partitions—a time aligned set of snapshots that together constitute a full backup of a table at the requested time (in some embodiments) and that can be used to restore the table to a requested point-in-time (in some embodiments).

As described herein, the aligned set of partitions (the partitions of a table) may be coherent (e.g., the aligned set of backups may represent a state of the database table at a target time (or at least relatively close points-in-time)), but causal consistency is not necessarily guaranteed.

In embodiments, the system may perform an on-demand backup in a similar fashion for a single partition of a table with multiple partitions, or as depicted in FIG. 11 for Table A, for the table as a whole, using a partition-by-partition process to accomplish the task.

Point-in-Time Restore

FIG. 10 is a process diagram illustrating a logical flow of a point-in-time restoration, according to some embodiments. A point-in-time restoration may be performed for a portion of a database table (e.g., a partition) or for the entire table, in some embodiments. As illustrated in FIG. 10, a request to restore a database table to a state of the database table at a target point-in-time (e.g., a point-in-time specified in the request, or otherwise) is received (block 1002). For example, a requesting entity, such as a client, a client device, a process executing on a service provider or client machine, or the like may request the point-in-time restore.

Requesting clients may wish to restore a table or partition in various ways. For example, a client may wish to restore over the existing table, or restore to a newly-created table while retaining the existing table. In some way, a table in a database service is identified for the restoration (block 1004), as directed by backup manager 824, for example.

In some embodiments, restoration and backup interface 826 may provide a customer-facing interface for a customer to experience a fully managed restoration or backup service. For instance, restoration and backup interface 826 may provide an interface (e.g., a graphical or program interface) that client devices or processes of a customer can access to manage restorations and backups, such as viewing the number of available backups as well as characteristics thereof, requesting on-demand backups or restorations, and the like.

In at least some embodiments, the restoration and backup interface 826 may provide a customer-facing interface that gives the customer the ability to configure table properties at the time of a restoration. For example, when a restoration is performed using the client-facing interface to a database service (e.g., 110) the restoration interface (e.g., 826) may provide access to the features provided via a client-facing interface of the database service. Managed-database service features, such as configuration of table properties, partition management, secondary indexing services and the like may be passed though from the database service to the client via the restoration and backup interface 826.

The disclosed technique may be performed by one or more processes. In one example, one process may be called to create the new table and another process may be called to perform the rest of the restoration. In some instances, a distinct process or node may perform steps 1006-1012 for a respective partition, the node hosting the partition, for example, may perform the steps 1006-1012 for that partition.

At block 1006, a separate archived partition is identified for each partition, based on the target point-in-time. For example, restoration manager 822 may identify an archived snapshot of a partition of the database table that is closest in time (either prior to the time, or subsequent to the time) to the target point-in-time. FIG. 11 illustrates a particular example for a point-in-time restoration. Change log stream SA3, in particular, illustrates that snapshot 1114 has been selected instead of snapshot 1109 because snapshot 1112 is closer in time to the requested time, a concept also applicable to on-demand backups that are scheduled, instead of performed at the requested time, in some embodiments. It is contemplated that archived partitions may be selected, in some embodiments, based on the amount of changes between the requested time and the archived partition. It may be preferable to select partitions associated with fewer changes between the partition and the requested time, even when the amount of time between the selected partition and the requested time is greater than another available partition, in embodiments.

For each partition, a segment of changes in a change log corresponding to the partition is identified for a period of time between the identified snapshot and the target point in time (block 1008), by the change log manager 214 in FIG. 2, for example. Block 1010 illustrates that for each partition, the identified segment is log-applied to the corresponding partition to generate an updated snapshot of the partition at the target point-in-time. Some combination of the change log manager 214 snapshot manager 212, log apply service 213, and the restore manager may perform such functions, in some embodiments, for example.

Going back to the illustrated example in FIG. 11, the change log data 1109CLD (represented by the shaded area) may be applied to the snapshot 1109 to walk the state of the partition backward in time to the state of the partition at the requested point-in-time. Items (e.g., restoration data 875) from the updated snapshot of the identified portion of the database (e.g., for a partition) are sent to the database service to create entries in the newly-identified database table (block 1012) in the illustrated embodiment, by restoration manager 822, for example.

The items may be sent as puts via a client-facing interface of the database service to a newly-created table, or to overwrite an existing table, in a few non-limiting examples. Successful completion of the point-in-time restore of the table may be acknowledged to the requesting entity (block 1014), via restoration and backup interface 826, for example.

FIG. 10 is a logical flow of a process that may be implemented various ways. For example, various different processes or nodes may each perform steps 1006-1012 for a respective partition, in parallel or sequentially without departing from the scope of this disclosure.

Restoration of on-demand backups may be performed, even if the on-demand backup has not been created or materialized—if the coherent artifacts have not been generated. For example, a process similar to that described above for point-in-time restore may be performed to create the table requested for on-demand restoration. If an on-demand backup has already been materialized and stored to durable storage, the log-apply process may be skipped and the items may be sent directly to the database service (e.g., via the client-facing interface or otherwise). For example, the items from separate partitions in durable storage that represent the backup may be streamed to the database service. In some embodiments, such a transfer may include a conversion (e.g., via forward/reverse converter 206) from non-native format to a native format of the database, as described above.

Client-Facing Interface of Database Service

Clients may generally access production database services of a service provider via a client-facing interface (e.g., a "front-door" of the database service, such as request routers of the database service). The service provider's internal processes may also access the database service via the client-facing interface, or may use a proprietary or "backend" interface to manage, restore, obtain partition copies, or otherwise access the database service, in embodiments. By, using the client-facing interface of the database service to enter the restore data into the table, the system may take advantage of the existing features of the database service that optimize the table performance.

The client-facing interface of the database service, or the restoration and backup interface 826, for example, may make the data that is being restored available to clients before the entire restoration has completed, in embodiments. In a particular example, clients may be given access to the restored data while the restoration data is simultaneously being put into the database. Such a technique may have the advantage of giving the client access to at least some of the data in (on average) half the time of the total restoration time, for example.

In some embodiments, the items from the updated snapshots (e.g., 875) may be sent by the restore manager 822 to create entries in the newly-identified database in database service 110 via either of the client-facing interface, or the backend interface of the database service. In some embodiments, by using the client-facing interface, the restoration process may leverage the existing functionality of the database service (e.g., the benefits of a fully-managed database service, managed table configurations—placement optimization at the time of restore etc., managed partitioning—fixing IOPS dilution via repartitioning etc., local and global secondary indexing services, or the like). Use of the client-facing alternative may decouple the restore process from the proprietary or technical features particular to the internal storage nodes of the database service.

Using the client-facing interface to the database service provides clients with access to existing features of the database service, such as automatically creating secondary index(es) as the restored partitions are loaded, changing the partitioning, streaming all the data changes out as items are added in, etc. For example, some database services provide managed features, such as providing streams of data indicating changes to the database table to which a customer may register a listener. In one example of many, such streams may provide full-text characteristics of database that does not support full-text search, for example. Clients may use such data for a variety of reasons. Another benefit of using the client-facing interface of such a database service is that it leverages such already-existing features of the database service without having to replicate them, as would be required in a back-end interface restoration scenario. In at least some embodiments, the restoration and backup interface 826 may provide for configuration of such features, such as turning the above-noted streaming feature off or on.

Use of the client-facing interface also has the benefit of leveraging the existing global secondary indexing (GSI) management of the existing database service.

Benefits of using a backend interface include faster data transfers to the storage nodes and greater control over the data. For example, restoring via a backend interface could provide clients with greater flexibility in controlling whether a new GSI is created or a LSI is deleted, instead of relying on the defaults, or non-existence of such features in the client-facing interface for such features.

The methods described herein may in various embodiments be implemented by any combination of hardware and software. For example, in one embodiment, the methods may be implemented by a computer system that includes a processor executing program instructions stored on a non-transitory, computer-readable storage medium coupled to the processor. The program instructions may be configured to implement the functionality described herein (e.g., the functionality of various servers and other components that implement the scalable, distributed data storage systems and/or remote key-value durable backup storage systems described herein (or another type of remote storage system suitable for backing up tables and/or partitions thereof).

Figure 12:
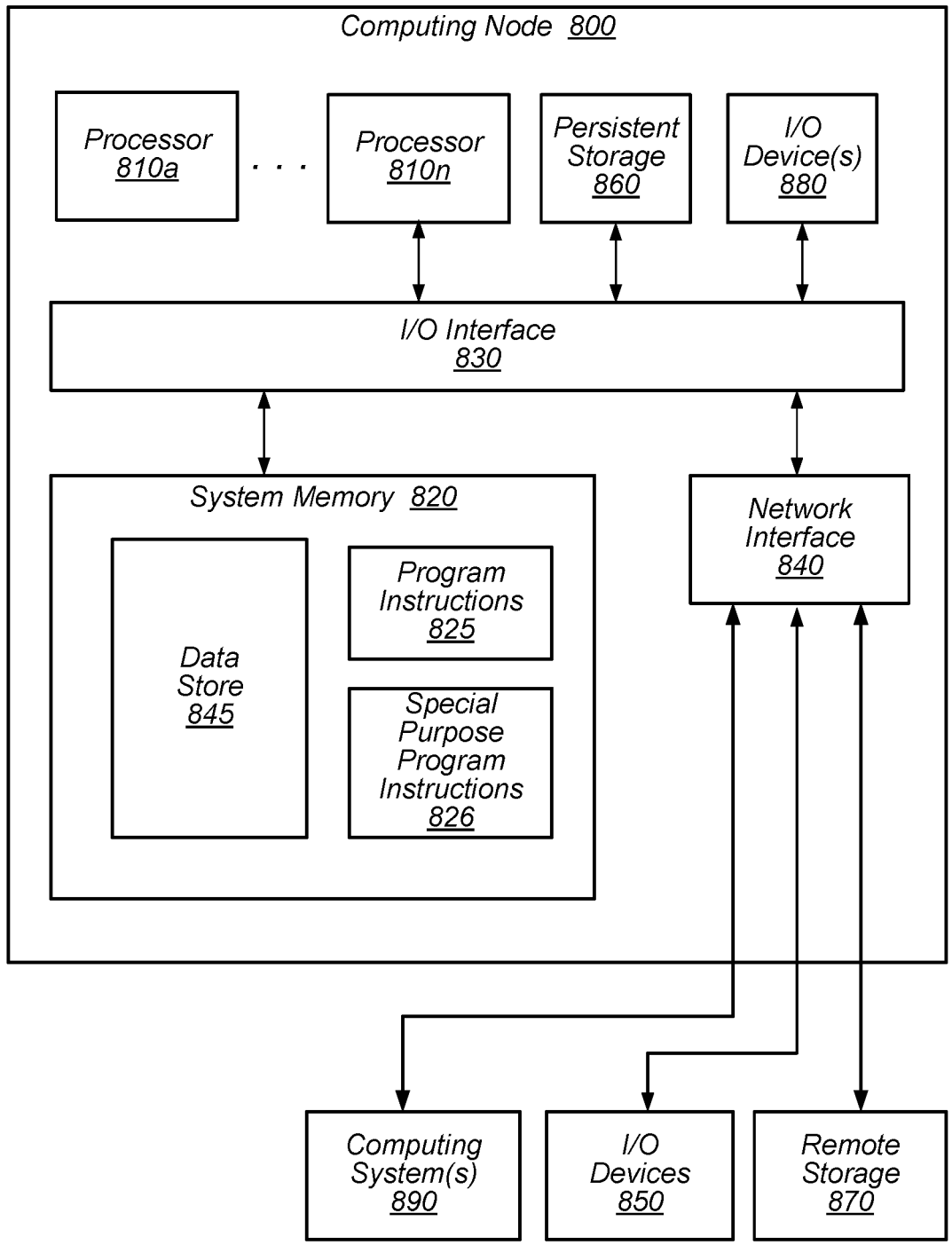
FIG. 12 is a block diagram illustrating a computer system configured to implement at least a portion of a system that includes continuous data protection, according to various embodiments.

FIG. 12 is a block diagram illustrating a computing node configured to implement at least a portion of a continuous data protection system, according to various embodiments described herein. For example, computing node 1200 may represent a computing node that implements one or more of the techniques or components described herein for providing continuous data protection, according to various embodiments. In various embodiments, computing node 1200 may be configured to implement any or all of the components of a system that implements a scalable, distributed data storage system and a corresponding continuous data protection system, or multiple computing nodes similar to or different from computing node 1200 may collectively provide this functionality. For example, in various embodiments, one or more computing nodes 1200 may implement database service 110, snapshot manager 212, change log manager 214, snapshot data store 142, change log archive 152, or clients 160. Additionally, any number of storage node instances may each host one or more replicas of various data partitions and/or metadata associated therewith. For example, any given storage node instance may host a replica acting as master replica for its replica group and/or a replica acting as a slave replica in its replica group.

Similarly, one or more computing nodes 1200 may implement a key-value durable backup storage system (or an interface or other component thereof), in different embodiments. Computing node 1200 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 1200, all of the computing nodes 1200 may include the same or similar hardware components, software components, and functionality, while in other embodiments the computing nodes 1200 comprising a computing system configured to implement the functionality described herein may include a wide variety of hardware components, software components, and functionality. In some embodiments, multiple computing nodes 1200 that collectively implement a data storage service or a remote storage system may be components of a larger shared resource system or grid computing system. It is noted that different elements of the system described herein may be implemented by different computing nodes 1200. For example, a computer system that supports the functionality described herein for performing continuous data protection may be implemented on the same computing nodes 1200 on which clients (through which a customer or subscriber may access the system) execute, or on one or more other computing nodes 1200, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 1200.

In the illustrated embodiment, computing node 1200 includes one or more processors 1210 (any of which may include multiple cores, which may be single or multithreaded) coupled to a system memory 1220 via an input/output (I/O) interface 1230. Computing node 1200 further includes a network interface 1240 coupled to I/O interface 1230. In various embodiments, computing node 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. Similarly, in a distributed computing system such as one that collectively implements a scalable database service or a remote storage service in which tables are baked up, each of the computing nodes may implement the same ISA, or individual computing nodes and/or replica groups of nodes may implement different ISAs.

The computing node 1200 also includes one or more network communication devices (e.g., network interface 1240) for communicating with other systems and/or components over a communications network (e.g. Internet, LAN, etc.). For example, a client application executing on computing node 1200 may use network interface 1240 to communicate with a server application executing on a single server or on a cluster of servers that implement a distributed system. In another example, an instance of a server application executing on computing node 1200 may use network interface 1240 to communicate with other instances of the server application that may be implemented on other computer systems.

In the illustrated embodiment, computing node 1200 also includes one or more persistent storage devices 1260 and/or one or more I/O devices 1280. In various embodiments, persistent storage devices 1260 may correspond to disk drives, tape drives, solid state memory, other mass storage devices, or any other persistent storage device. Computing node 1200 (or a distributed application or operating system operating thereon) may store instructions and/or data in persistent storage devices 1260, as desired, and may retrieve the stored instruction and/or data as needed.

Computing node 1200 includes one or more system memories 1220 that are configured to store instructions and/or data (shown as program instructions 1225 and data store 1245, respectively) that are accessible by processor(s) 1210. In various embodiments, system memories 1220 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1220 may contain program instructions 1225 that are executable by processor(s) 1210 to implement the methods and techniques described herein.

In the illustrated embodiment, program instructions and data implementing desired functions, methods or techniques (such as functionality for backing up tables, and/or restoring tables from backup using any or all of the mechanisms described herein), are shown stored within system memory 1220 as program instructions 1225. For example, program instruction 1225 may include program instructions that when executed on processor(s) 1210 implement any or all of a continuous data protection system 112, storage service 290, various data stores and archives, and/or any other components, modules, or sub-modules of a system that provides the data storage system and services described herein. Program instructions 1225 may also include program instructions configured to implement additional functionality of a system that implements a data storage service not described herein. In some embodiments, program instructions 1225 may include program instructions configured to implement functionality of a key-value durable backup storage system or another type of remote storage system suitable for backing up tables and/or partitions thereof. In some embodiments, program instructions 1225 may implement multiple separate clients, server nodes, and/or other components.

It is noted that in some embodiments, program instructions 1225 may include instructions and data implementing desired functions that are not directly executable by processor(s) 1210 but are represented or encoded in an abstract form that is translatable to instructions that are directly executable by processor(s) 1210. For example, program instructions 1225 may include instructions specified in an ISA that may be emulated by processor 1210, or by other program instructions 1225 executable on processor(s) 1210. Alternatively, program instructions 1225 may include instructions, procedures or statements implemented in an abstract programming language that may be compiled or interpreted in the course of execution. As non-limiting examples, program instructions 1225 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 1225 may include instructions executable to implement an operating system (not shown), which may be any of various operating systems, such as UNIX, LINUX, Solaris™, MacOS™, Windows™, etc. Any or all of program instructions 1225 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 1200 via I/O interface 1230. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 1200 as system memory 1220 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1240.

In other embodiments, program instructions and/or data as described herein for implementing a data storage service that employs the techniques described above may be received, sent or stored upon different types of computer-readable media or on similar media separate from system memory 1220 or computing node 1200. Program instructions and data stored on a computer-readable storage medium may be transmitted to a computing node 1200 for execution by a processor 1210 by transmission media or signals such as electrical, electromagnetic, or digital signals, which may be conveyed via a communication medium such as a network and/or a wireless link, such as may be implemented via network interface 1240. In some embodiments, system memory 1220 may include data in data store 1245 and/or program instructions 1225 and/or special purpose instructions 1226, which may be configured as described herein. In some embodiments, data store 1245 may store the snapshots, or the change stream items, for example. In some embodiments, special purpose program instructions 1226 may include instructions that implement the continuous data protection manager 112, the storage service 290, or the database service 110, for example.

In some embodiments, system memory 1220 may include data store 1245, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 1245 or in another portion of system memory 1220 on one or more nodes, in persistent storage 1260, and/or in remote storage 1270, in various embodiments. In some embodiments, and at various times, system memory 1220 (e.g., data store 1245 within system memory 1220), persistent storage 1260, and/or remote storage 1270 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 1270 may be a key-value durable storage system in which tables (and/or partitions thereof) are backed up and from which they are restored, as described herein.

Data store 1245 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 1230 may be configured to coordinate I/O traffic between processor(s) 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computing node 1200 and other devices attached to a network, such as other computer systems 1290 (which may implement one or more server nodes and/or clients of a scalable, distributed data storage system and/or a remote key-value durable storage system), for example. In addition, network interface 1240 may be configured to allow communication between computing node 1200 and various I/O devices 1250 and/or remote storage 1270), or between other nodes in a system providing shared computing services. In general, network interface 1240 may be configured to allow data to be exchanged between computing node 1200 and any of a variety of communication devices, external storage devices, input/output devices and/or other computing devices, in different embodiments.

Input/output devices 1250 may, in some embodiments, include one or more display terminals, keyboards, keypads, touchpads, scanning devices, voice or optical recognition devices, or any other devices suitable for entering or retrieving data by one or more computing nodes 1200. Multiple input/output devices 1250 may be present in computing node 1200 or may be distributed on various nodes of a distributed system that includes computing node 1200. In some embodiments, similar input/output devices may be separate from computing node 1200 and may interact with one or more nodes of a distributed system that includes computing node 1200 through a wired or wireless connection, such as over network interface 1240. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol. In various embodiments, computing node 1200 may include more, fewer, or different components than those illustrated in FIG. 12 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 1200, and if so, may interact with various input/output devices 1250 to provide and/or receive information. Alternatively, other clients/users may use client computing systems to access the system, such as remotely via network interface 1240 (e.g., via the Internet and/or the World Wide Web). In addition, some or all of the computing nodes of a system providing the service may provide various feedback or other general types of information to clients/users (e.g., in response to user requests) via one or more input/output devices 1250.

It is noted that any of the distributed system embodiments described herein, or any of their components, may be implemented as one or more web services. For example, a front-end module or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 1200 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 1200 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 1200 may be transmitted to computing node 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

The invention claimed is:

1. A system, comprising:
  a plurality of storage nodes, each of which comprises one or more storage devices or logical storage volumes of a database service that stores data in partitions;
  a copy data store that stores a separate backup copy of a partition for each of a plurality of partitions of a database table, wherein creation times for two or more respective partition backup copies for respective partitions of the plurality of partitions of the database table are distinct;
a change log archive that stores separate change logs for each partition; and
one or more computing devices comprising one or more processors and memory storing program instructions that implement a data protection manager configured to perform:
in response to a request to perform a restoration of a database table:
reading a separate partition backup copy for each of a plurality of partitions of the database table, wherein two or more of the partition backup copies that are read have distinct creation times from one another;
identifying a respective segment of a separate change log for each partition based on a restore time for the database table and a respective creation time for each partition backup copy, wherein the segments corresponding to the two or more partition backup copies that have distinct creation times are for different lengths of time;
applying the identified segments of the change logs to the respective partition backup copies to generate new partition copies for the restore time; and
writing the new partition copies to restore the database table to the restore time.

2. The system recited in claim 1, wherein the program instructions when executed by the one or more processors cause the one or more processors to perform:
altering, during the restoration of the database to the restore time, a quantify of partitions of the database;
wherein the quantity of partitions is based at least in part on a time taken for a partition to perform an input/output operation per second from start to finish (TOPS).

3. The system recited in claim 1, wherein the program instructions when executed by the one or more processors cause the one or more processors to perform:
directing creation of a new table in the database service for the restore;
wherein said writing the new partition copies to restore the database to the restore time comprises:
writing new partition copies to durable storage in a copy data store; and
sending items from the new partition copies in the copy data store to the new table in the database service via a client-facing interface of the database service.

4. A method, comprising:
reading a separate partition backup copy for each of a plurality of partitions of a database, wherein creation times for two or more respective partition backup copies for respective partitions of the plurality of partitions of the database are distinct;
identifying a respective segment of a separate change log for each partition based on a restore time for the database and a respective creation time for each partition backup copy, wherein the segments corresponding to the two or more partition backup copies that have distinct creation times are for different lengths of time;
applying the identified segments of the change logs to the respective partition backup copies to generate new partition copies for the restore time; and
writing the new partition copies to restore the database to the restore time.

5. The method as recited in claim 4, wherein
at least one of the creation times corresponding to one of the respective partitions is chronologically subsequent to the restore time;
said identifying the segment of the respective change log corresponding to the at least one creation time comprises:
identifying the segment of the respective change log based on changes in the respective change log after the restore time and prior to the at least one creation time corresponding to the respective change log; and
said applying the identified segments of the change logs to generate new partition copies for the restore time comprises applying the changes in the respective change log after the restore time period to the respective partition.

6. The method as recited in claim 4, further comprising:
altering, during the restoration of the database to the restore time, a quantify of partitions of the database;
wherein the quantity of partitions is based at least in part on a time taken for a partition to perform an input/output operation per second from start to finish (TOPS).

7. The method recited in claim 4, further comprising:
prior to restoration of the database:
providing, via a restoration interface, configuration options for configuring properties of the restored database;
receiving, via the restoration interface, selection of one or more of the configuration options; and
configuring the restored database in accordance with the selected configuration options.

8. The method recited in claim 4, further comprising:
receiving one or more queries, via a client-facing interface of a database service, for restored items in of the new partition copies; and
servicing the queries while the new partition copies are being written to restore the database to the restore time.

9. The method recited in claim 4, further comprising:
directing creation of a new database in a database service for the restore;
wherein said writing the new partition copies to restore the database to the restore time comprises:
writing new partition copies to durable storage in a copy data store; and
sending items from the new partition copies in the copy data store to the new database in the database service via a client-facing interface of the database service.

10. The method recited in claim 4,
wherein said writing the new partition copies to restore the database to the restore time comprises:
writing new partition copies to durable storage in a copy data store; and
sending items from the new partition copies to overwrite entries in the source database via a client-facing interface.

11. The method recited in claim 4,
wherein said reading, said identifying, said applying, and said writing are triggered by receipt, from a requesting entity, of a request to restore the database to a state of the database at the restore time;
the method further comprising:
acknowledging successful completion of the requested restore of the database to the requesting entity.

12. A non-transitory computer-readable storage medium storing program instruction that, if executed by a processor, cause the processor to perform:

reading a separate partition backup copy for each of a plurality of partitions of a database, wherein at least one creation time for a respective partition of the database is distinct from another creation time of another respective partition of the database;

identifying a segment of a respective change log corresponding to the one creation time for the respective partition;

identifying another segment of another respective change log corresponding to the other creation time for the other respective partition, wherein the segment and the other segment are for different lengths of time;

applying the identified segments of the change logs to the respective partition backup copies to generate new partition copies for the restore time; and writing the new partition copies to restore the database to the restore time.

13. The non-transitory computer-readable storage medium in claim 12,
wherein the program instruction if executed by the processor, further cause the processor to perform:
receiving one or more queries, via the client-facing interface of a database service, for restored items in of the new partition copies; and
servicing the queries while the new partition copies are being written to restore the database to the restore time.

14. The non-transitory computer-readable storage medium in claim 12,
wherein the program instruction if executed by the processor, further cause the processor to perform:
directing creation of a new database in a database service for the restore;
wherein said writing the new partition copies to restore the database to the restore time comprises:
writing new partition copies to durable storage in a copy data store; and
sending items from the new partition copies in the copy data store to the new database in the database service via a client-facing interface of the database service.

15. The non-transitory computer-readable storage medium in claim 12, wherein the program instruction if executed by the processor, further cause the processor to perform:
altering, during the restoration of the database to the restore time, a quantify of partitions of the database;
wherein the quantity of partitions is based at least in part on a time taken for a partition to perform an input/output operation per second from start to finish (TOPS).

16. The non-transitory computer-readable storage medium in claim 12, wherein the program instruction if executed by the processor, further cause the processor to perform:
providing, via a restoration interface, configuration options for configuring properties of the restored database;
receiving, via the restoring interface, selection of one or more of the configuration options; and
configuring the restored database in accordance with the selected configuration options.

17. The non-transitory computer-readable storage medium in claim 12, wherein the program instruction if executed by the processor, further cause the processor to perform:
receiving, from a requesting entity, a request to restore the database to a state of the database at the restore time;
wherein said reading, said identifying, said applying, and said writing are triggered by the request to restore; and
acknowledging successful completion of the requested restore of the database to the requesting entity.

* * * * *